US012744194B2

(12) United States Patent
Alavi et al.

(10) Patent No.: US 12,744,194 B2
(45) Date of Patent: Sep. 22, 2026

(54) MULTIMODE ION DETECTOR WITH WIDE DYNAMIC RANGE AND AUTOMATIC MODE SWITCHING

(71) Applicants: Kimia Analytics Inc., Thornhill (CA); Quadrocore Corp., Toronto (CA)

(72) Inventors: Sina Alavi, North York (CA); Gholamreza Javahery, Thornhill (CA); Dmitry Valyaev, Richmond Hill (CA); Victor Titov, Etobicoke (CA)

( * ) Notice: Subject to any disclaimer, the term of this patent is extended or adjusted under 35 U.S.C. 154(b) by 381 days.

(21) Appl. No.: 18/380,019

(22) Filed: Oct. 13, 2023

(65) Prior Publication Data

US 2024/0128070 A1 Apr. 18, 2024

Related U.S. Application Data

(60) Provisional application No. 63/416,388, filed on Oct. 14, 2022.

(51) Int. Cl.
*H01J 49/00* (2006.01)
*H01J 49/02* (2006.01)
*H01J 49/06* (2006.01)

(52) U.S. Cl.
CPC ........ *H01J 49/0095* (2013.01); *H01J 49/027* (2013.01); *H01J 49/061* (2013.01)

(58) Field of Classification Search
None
See application file for complete search history.

(56) References Cited

U.S. PATENT DOCUMENTS 4,227,087 A * 10/1980 Kurz .................... H01J 49/025 250/397
4,267,448 A * 5/1981 Feser ........................ G01T 1/28 250/281

(Continued)

FOREIGN PATENT DOCUMENTS

EP 0193311 A2 * 9/1986 ............ H01J 49/025
GB 2421841 A * 7/2006 ............ H01J 49/025

(Continued)

OTHER PUBLICATIONS

English machine translation for JP-H08138621-A (Year: 1996).*
English machine translation for JP-H10154483-A (Year: 1998).*

*Primary Examiner* — David E Smith
*Assistant Examiner* — Alina Kaliszewski
(74) *Attorney, Agent, or Firm* — Nasser Ashgriz; UIPatent Inc.

(57) ABSTRACT

The present invention is ion detection method for mass spectrometer. An electron multiplier is coupled with a conversion dynode for the detection of positive and negative ions. The aperture of the present system is ungrounded. As the ions (positive or negative) approach and go through the aperture, they induce an image current into the aperture plate which can be amplified and measured by a processing circuit. The magnitude of the image current is directly proportional to the number density, speed, charge, and polarity of ions flowing through the aperture. The measured image current is used as a means to switch between various detection modes. The measured current is calibrated and used as a reference to automatically switch between analog/counting modes, positive/negative ion detection, or various types of detectors implemented in the ion detection system.

29 Claims, 30 Drawing Sheets

(56) References Cited

U.S. PATENT DOCUMENTS 4,423,324 A * 12/1983 Stafford .................. G21K 1/14 976/DIG. 437
4,766,312 A * 8/1988 Fergusson ............ H01J 49/025 250/281
4,810,882 A * 3/1989 Bateman ................ H01J 49/32 250/397
5,202,561 A * 4/1993 Giessmann ......... H01J 49/0095 250/281
5,625,186 A * 4/1997 Frankevich .......... H01J 49/424 250/282
5,773,822 A * 6/1998 Kitamura ............. H01J 49/025 250/281
6,025,590 A * 2/2000 Itoi ...................... H01J 49/025 250/281
9,899,201 B1 * 2/2018 Park ...................... H01J 49/025
10,468,239 B1 * 11/2019 Steiner ................ H01J 49/0031
2004/0041092 A1 * 3/2004 Yamaguchi ........... H01J 49/025 250/397
2005/0109947 A1 * 5/2005 Turner .................. H01J 49/025 250/397
2011/0240857 A1 * 10/2011 Kovtoun ................ H01J 40/14 250/336.1
2011/0315869 A1 * 12/2011 Ishiguro ............... H01J 49/067 250/288
2012/0032072 A1 * 2/2012 Quarmby ............. H01J 49/025 250/281
2012/0091332 A1 * 4/2012 Makarov ................ H01J 49/40 250/281
2013/0068942 A1 * 3/2013 Verenchikov ......... H01J 49/062 250/282
2013/0264474 A1 * 10/2013 Kholomeev .......... H01J 49/025 250/336.1
2013/0313425 A1 * 11/2013 Verenchikov .......... H05K 3/027 250/288
2014/0151549 A1 * 6/2014 Steiner .................... H01J 43/30 250/288
2014/0217275 A1 * 8/2014 Ding ................... H01J 49/4245 250/282
2015/0162174 A1 * 6/2015 Badiei ................. H01J 49/0009 250/288
2016/0336165 A1 * 11/2016 Guna .................... H01J 49/282
2020/0234939 A1 * 7/2020 Cheung ................. H01J 49/061
2022/0102125 A1 * 3/2022 Li ............................. G01T 1/28
2022/0189755 A1 * 6/2022 Sumigama .......... H01J 49/0036
2022/0351956 A1 * 11/2022 Fisher ..................... H01J 49/40
2023/0005732 A1 * 1/2023 Cheng ................... H01J 49/105
2023/0105334 A1 * 4/2023 Silivra .................. H01J 49/025 250/281

FOREIGN PATENT DOCUMENTS

JP H08138621 A * 5/1996 ............ H01J 49/025
JP H10154483 A * 6/1998

* cited by examiner

MULTIMODE ION DETECTOR WITH WIDE DYNAMIC RANGE AND AUTOMATIC MODE SWITCHING

FIELD OF THE INVENTION

The present invention generally relates to a method of mass spectrometry and a mass spectrometer, and particularly to an ion detector that detects positive ions and negative ions.

BACKGROUND OF THE INVENTION

Mass spectrometers are versatile and accurate devices for detecting and studying atoms and molecules by means of their mass-to-charge ratio. Modern mass spectrometers, as depicted in FIG. 1, comprise of five essential components: (1) a sample introduction system, (2) a sample ionization system (3) a sampling interface, (4) one or a set of mass analyzers, and (5) an ion detector. One of the capabilities of mass spectrometry is its ability to do simultaneous analysis along the whole mass range. In some applications, the range of signal intensities for various masses is different by orders of magnitudes. Therefore, in order to realize the full capabilities of a mass spectrometer in simultaneous analysis, having an ion detector with a wide linear dynamic range is necessary. At the same time, while most applications of mass spectrometry deal with positive ions, some analytes are negatively ionized. In such applications, the ion detector should be able to detect both positive and negative ions. Currently, several types of ion detectors are used in mass spectrometers depending on the application.

One of the earliest ion detectors used in mass spectrometry was the Faraday cup, as shown in FIG. 2. In this case, the beam of ions is directed toward a metallic electrode. The geometry and form factor of the electrode may be especially designed to fit a certain application. As the ions hit the electrode at high speeds, a current is formed within the electrode. This current can be measured, for example using a pico-ammeter, and calibrated to determine the number of ions. Faraday cups are not very sensitive, which makes them suitable only when the current of the incident ions is high. The working range for a Faraday cup is typically between $10^8$ and $10^{19}$ counts per second (cps) which is equivalent to 16 pA to 1.6 A, respectively. As a result, they are not suitable for trace analysis applications where sensitivity is paramount. Faraday cups are however very stable and suitable for some isotope measurement applications.

Another type of ion detector that is most widely used in mass spectrometry is electron multiplier (EM). These detectors are generally divided into three main types: (1) discrete dynode multipliers, (2) continuous dynode multipliers, and (3) microchannel plate (MCP). Discrete dynode multipliers, as shown in FIG. 3, are comprised of an array of separate metallic dynodes arranged in a way to multiply electrons. Depending on the number of dynodes and design of the detector, these EMs may be able to achieve gains as high as $10^9$, but typically around $10^6$-$10^8$ cps.

Continuous dynode multipliers as shown in FIG. 4, also known as Channeltron, are similar in principle to discrete dynode EMs. However, instead of discrete dynodes, they employ a continuous dynode for electron multiplication. Microchannel plate (MCP) detectors, on the other hand, are comprised of a 2D array of microchannels each serving as a separate multiplier. This architecture enables them to provide spatial resolution in contrast to the other two EM types. For this reason, they are typically used in time-of-flight and sector-field mass spectrometers. Detection capabilities typically range between $10^0$-$10^6$, therefore they all have a limited dynamic range.

In many applications, the output of the EM is typically measured in pulse counting (digital) mode. In this case, a fast preamplifier is connected to the output of the detector. The output of the preamplifier is connected to a pulse height (digital) discriminator which discriminates against stray photons, spurious emission inside the cone, and other noise pulses. Finally, a counter is used to count the number of pulses. Counting mode can provide a range of about 1-$10^6$ cps and is ideal for detection of trace levels of atoms and molecules in which high sensitivity is necessary.

FIG. 5 summarizes the dynamic range of ion detectors working in various modes. A single mode is not able to cover the whole range from 1 to $10^{19}$ cps. Therefore, using a single method would either limit simultaneous detection of various masses at high and low concentrations, or result in saturation of the signal for high concentration masses. For example, in inductively coupled plasma mass spectrometry (ICP-MS), the abundance of stable isotopes is much higher than other isotopes, especially rare isotopes. In order to detect the full spectrum, it is desirable to use an appropriate detection system for each isotope.

Another method is by using a combination of two detectors such as a Faraday cup and an EM. In such a case, two separate scans must be performed. One scan is done for detection of high concentration masses, while the other scan is used to detect the ions at low concentrations. This is not desirable for simultaneous detection in modern mass spectrometry. FIGS. 6 and 7A and 7B show prior art detection for positive and negative ions by conversion dynode (CD).

Different detectors have a limited detection capability. A combination of pulse counting, analog mode, and faraday cup in one detection system will provide the necessary dynamic range (1-$10^{20}$ CPS) for detection of high and low abundance ions simultaneously.

We present a new technique to increase the dynamic range of the detector for both positive and negative ions, as well as maximizing the lifetime of the detector. An innovative method is introduced to automatically switch between various detection modes depending on the number density and polarity of the incoming ions.

BRIEF DESCRIPTION OF THE DRAWINGS

The following figures are provided. Embodiments herein will hereinafter be described in conjunction with the appended drawings provided to illustrate and not to limit the scope of the claims, wherein like designations denote like elements.

DETAILED DESCRIPTION

Figure 1:
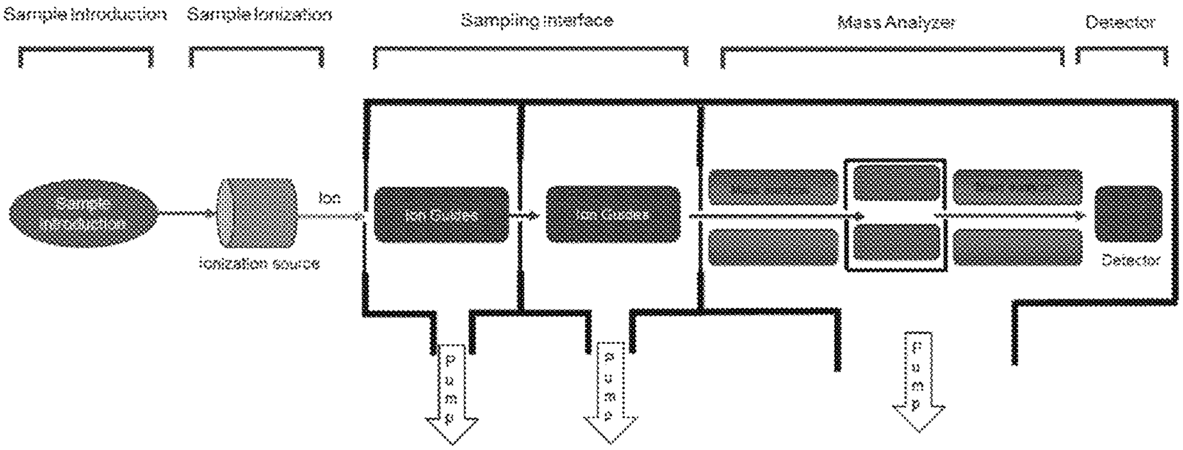
FIG. 1 (PRIOR ART)
FIG. 1 shows different elements of a mass spectrometer.
Figure 2:
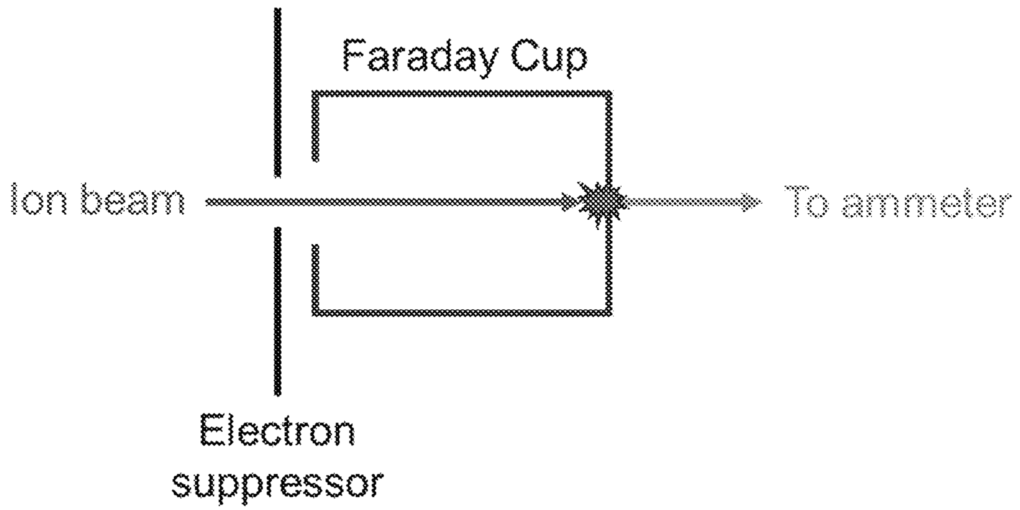
FIG. 2 (PRIOR ART)
FIG. 2 shows a faraday cup.
Figure 3:
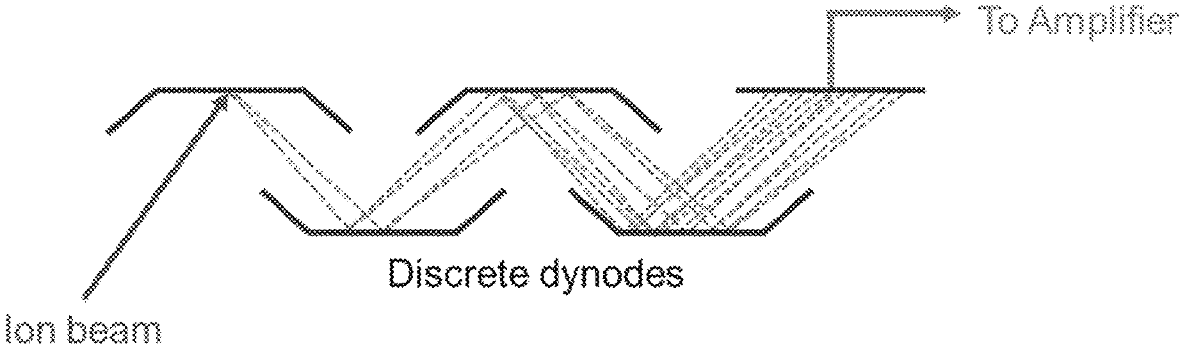
FIG. 3 (PRIOR ART)
FIG. 3 shows a discrete dynode electron multiplier.
Figure 4:
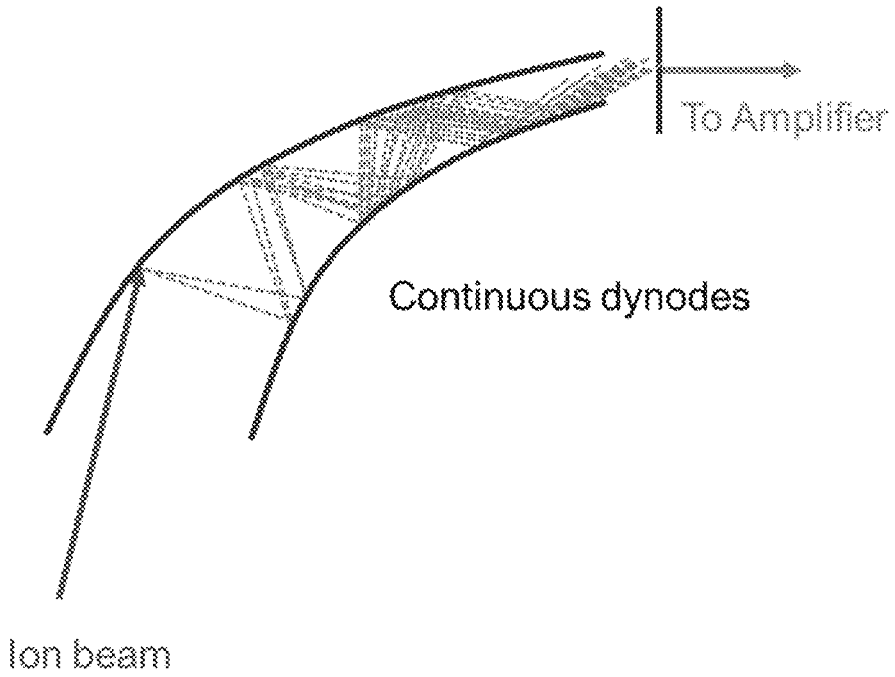
FIG. 4 (PRIOR ART)
FIG. 4 shows a continuous dynode electron multiplier.
Figure 5:
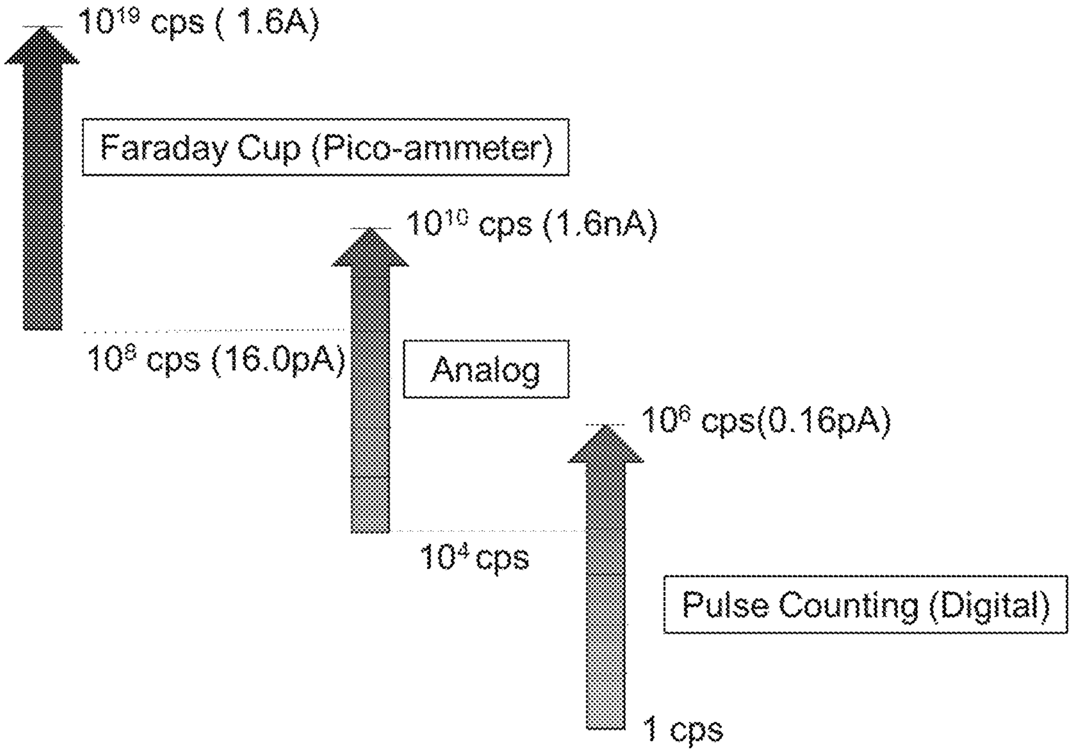
FIG. 5(PRIOR ART)
FIG. 5 shows typical dynamic range for various detection modes.
Figure 6:
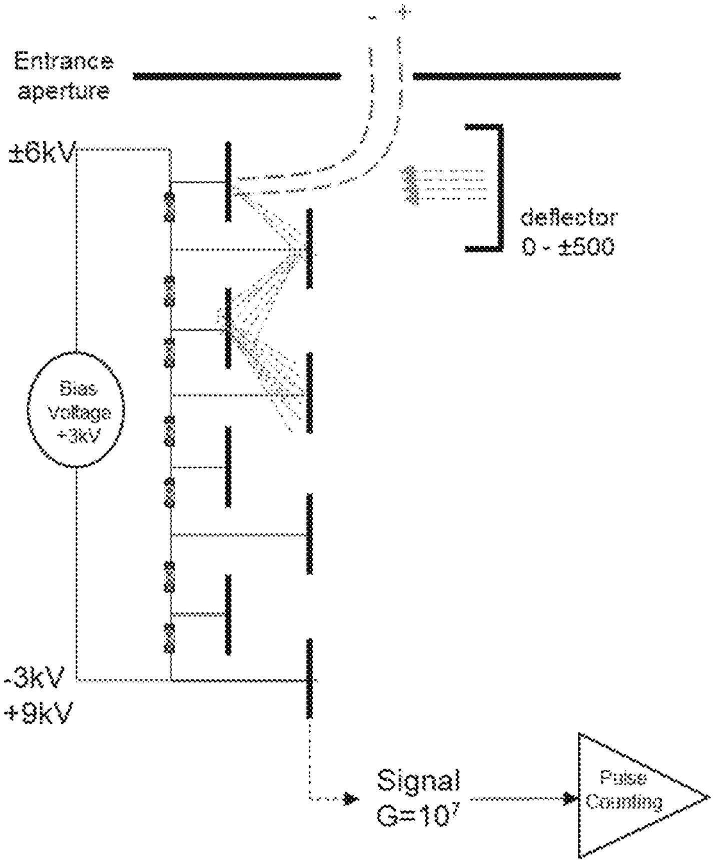
FIG. 6(PRIOR ART)
FIG. 6 shows prior art detector with a deflector.
Figure 7A:
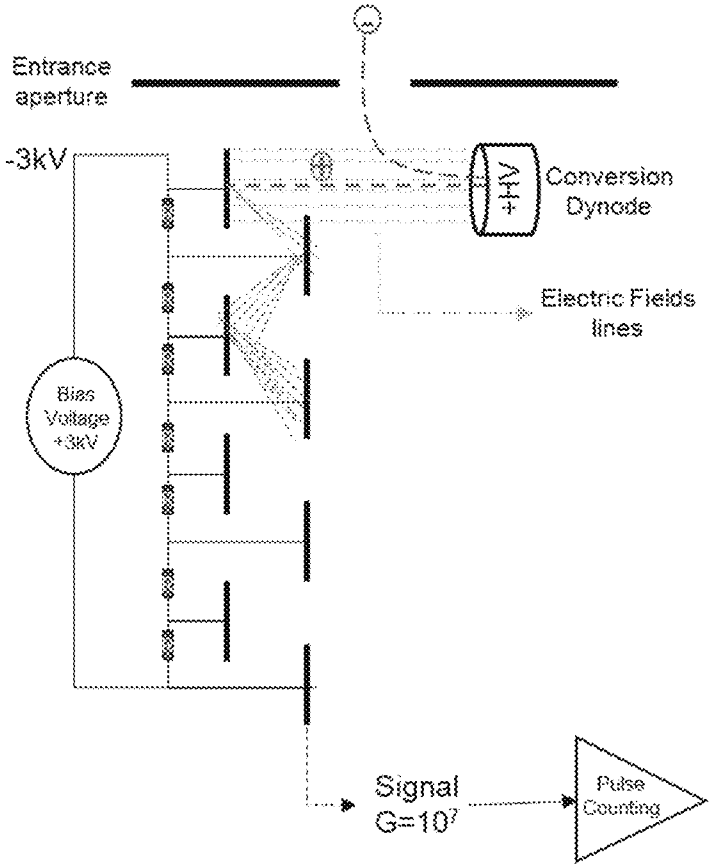
FIG. 7A(PRIOR ART)
FIG. 7A shows prior art detection for negative ions by conversion dynode (CD).
Figure 7B:
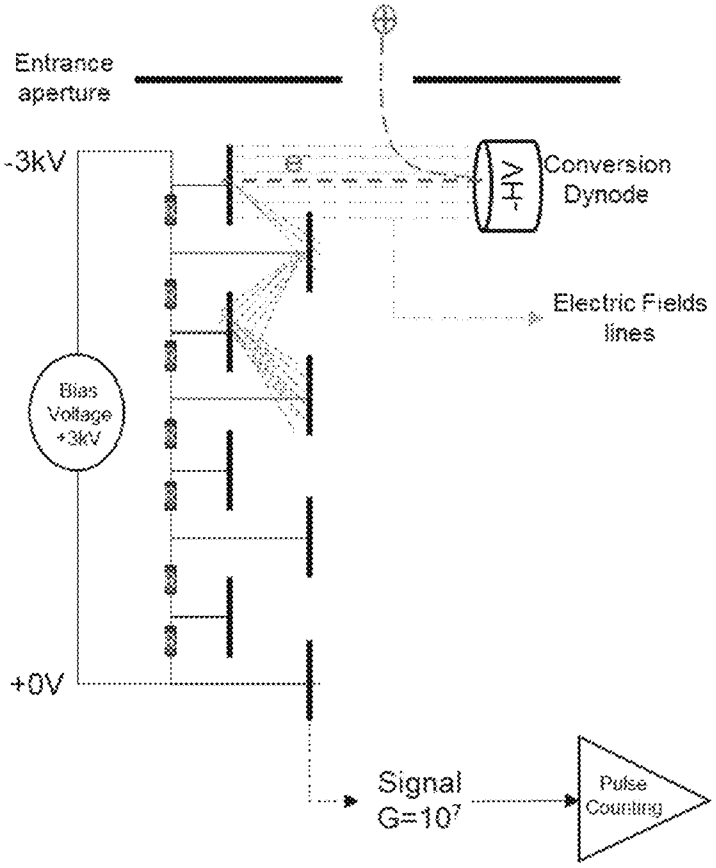
FIG. 7B(PRIOR ART)
FIG. 7B shows prior art detection for positive ions by conversion dynode (CD).
Figure 8A:
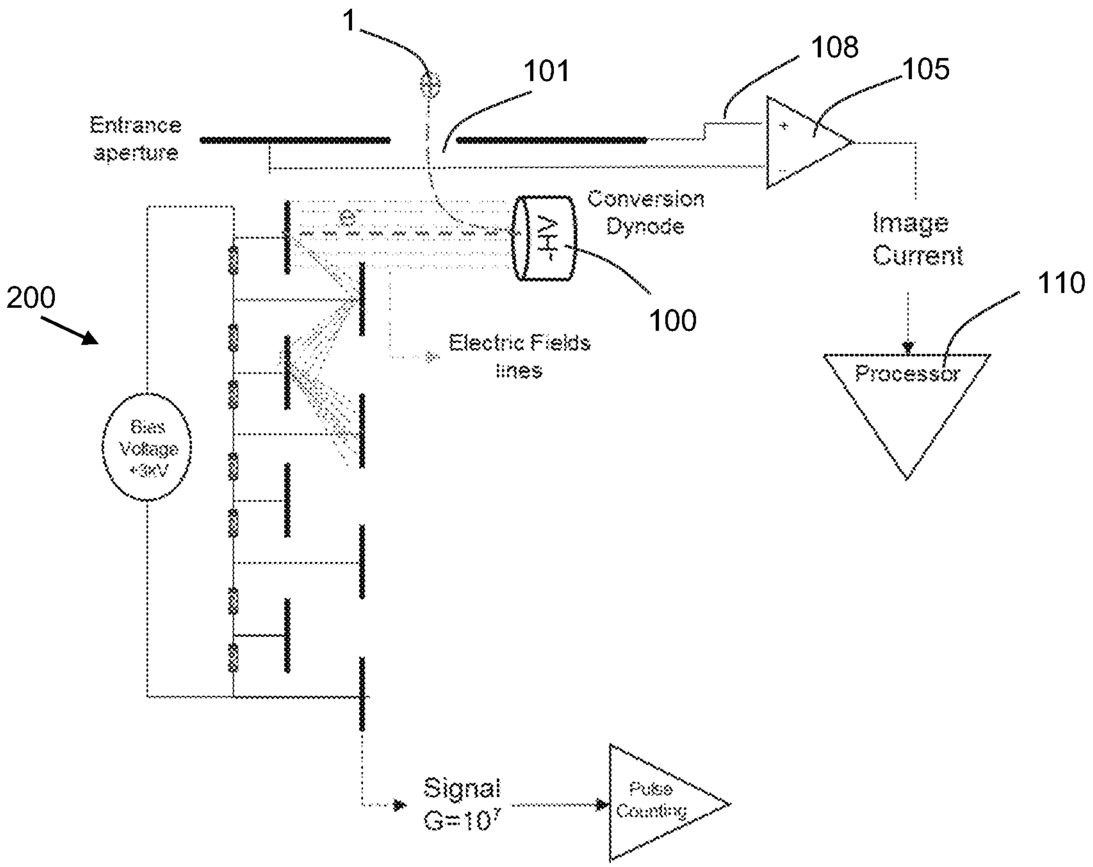
FIG. 8A shows detection of negative ions by conversion dynode (CD), wherein the image current (IC) is on the entrance lens.
Figure 8B:
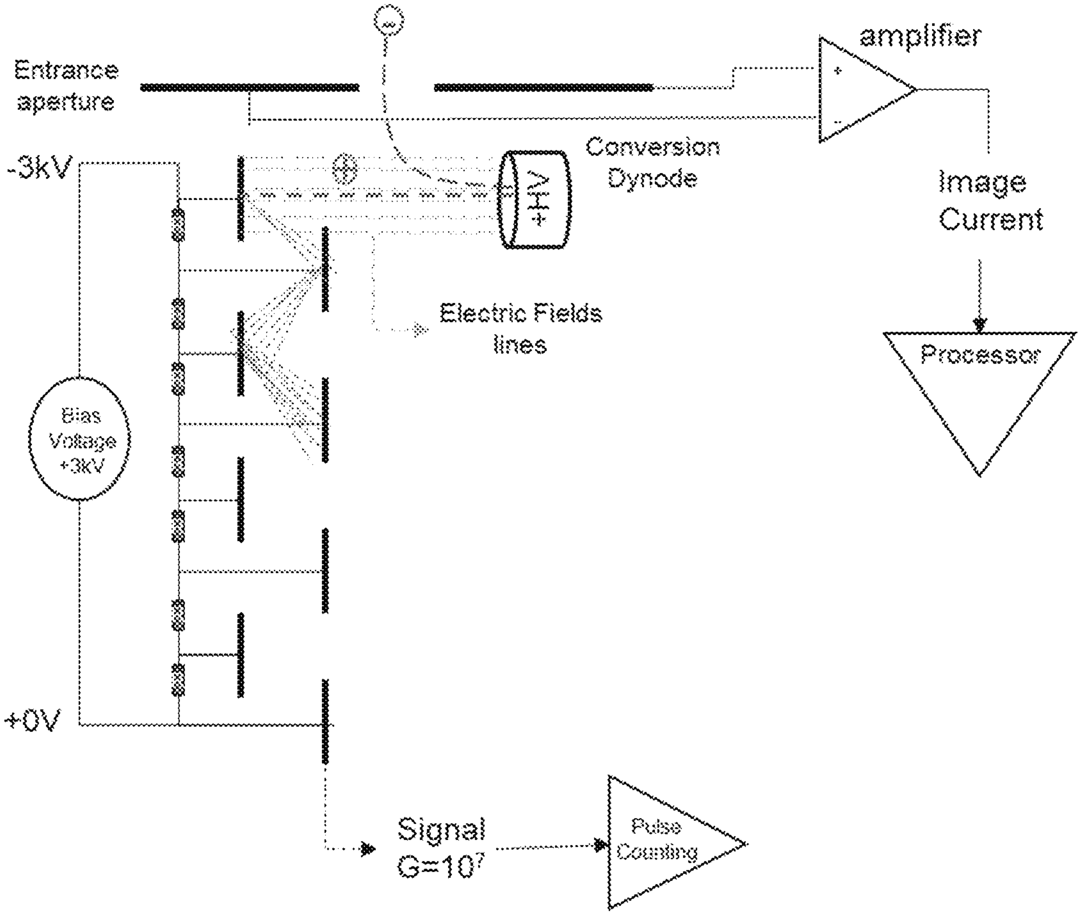
FIG. 8B shows detection of positive ions by conversion dynode (CD), wherein the image current (IC) is on the entrance lens.

FIGS. 8A and 8B show the first embodiment of the present invention in which an electron multiplier 200 is coupled with a conversion dynode 100 for the detection of positive (FIG. 8A) and negative (FIG. 8B) ions. Initially, the ions 1 go through an entrance aperture 101. Unlike prior methods in which the entrance aperture is grounded, in the present invention an ungrounded conductive aperture plate, referred to as the image current plate, is used. As the ions (positive or negative) approach and go through the aperture, they induce an image current 108 into the aperture plate which can be amplified by an amplifier 105 and measured by a signal processing circuit 110. The image current plate may have one or more entrance apertures, and it can be a grid or a mesh with multiple entrance apertures.

The magnitude of the image current is directly proportional to the number density, speed, charge, and polarity of ions flowing through the aperture. Image current has been previously used to directly detect ions, for example in FT-ICR or Orbitrap® mass spectrometers. However, in the current work, the measured image current is used as a means to switch between various detection modes. In other words, the measured current is calibrated and used as a reference to automatically switch between analog/digital modes, positive/negative ion detection, or various types of detectors implemented in the ion detection system. This is an important aspect of the current invention.

An additional grounded aperture plate (not shown in FIG. 8A) may be placed in front of the image current aperture to shield the latter from electromagnetic field effects due to the mass analyzer in front of the detector and minimize error in measuring the image current. The additional plate may have one or more apertures to let the ion beam pass through and reach the one or more entrance aperture of the image current plate. The additional conductive plate may be a conductive grid or a mesh with multiple apertures, pores, or openings.

Figure 9A:
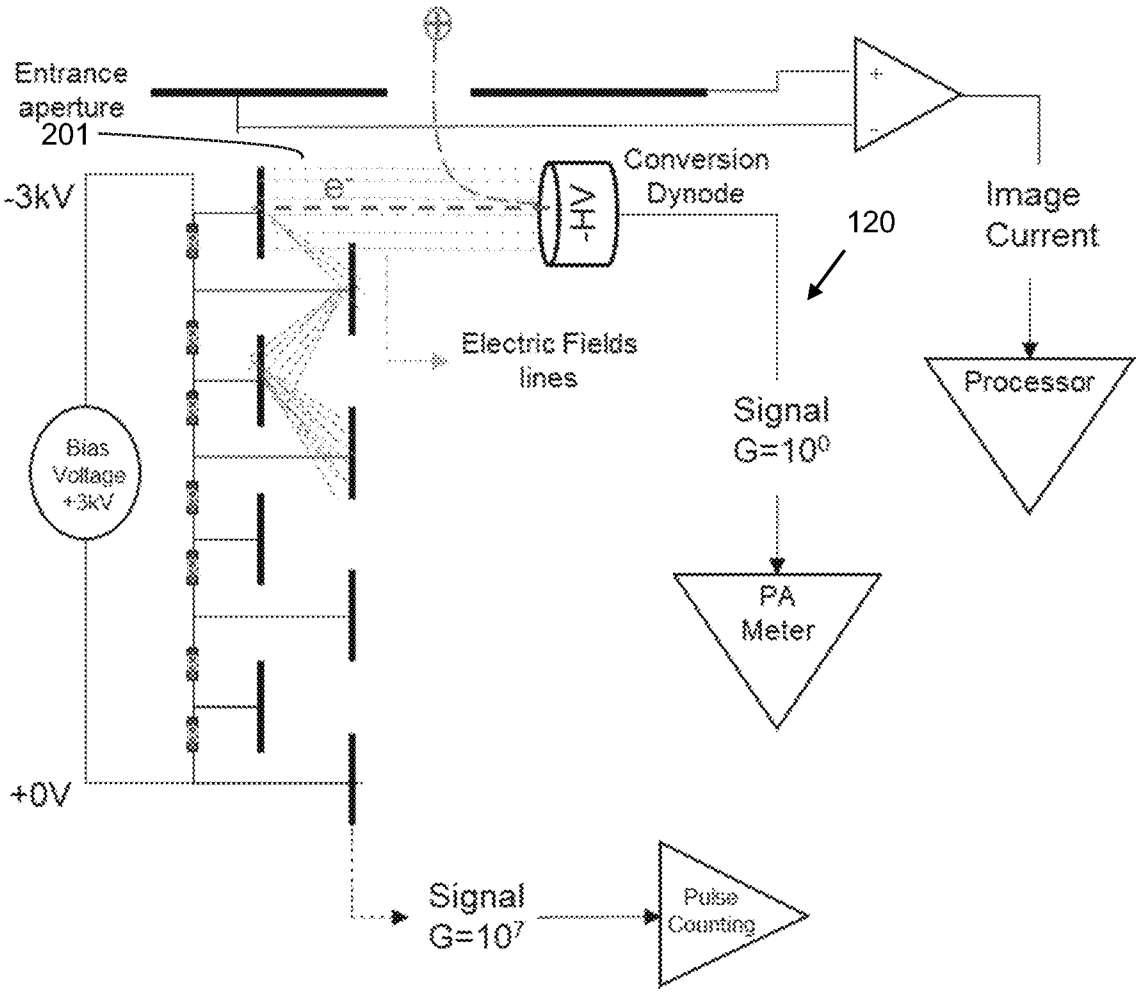
FIG. 9A shows detection of negative ions by conversion dynode, wherein the conversion dynode used as Faraday cup (FC).
Figure 9B:
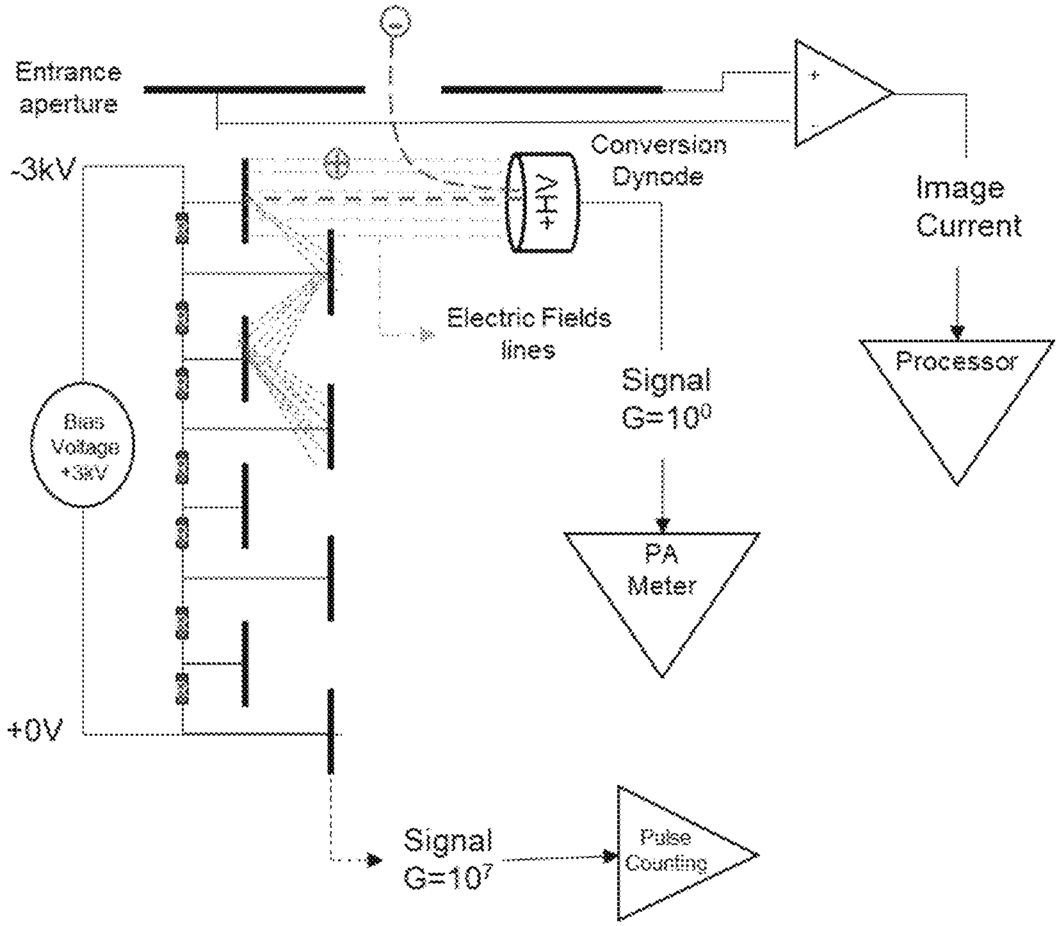
FIG. 9B shows detection of positive ions by conversion dynode, wherein the conversion dynode used as Faraday cup (FC).

FIGS. 9A and 9B show another embodiment of the present invention in which the conversion dynode is also used as a Faraday cup in combination with the image current detector 120. For detection of positive ions (FIG. 9A), as the ions go through the entrance aperture 201, the resulting image current is monitored. If the current is lower than a certain threshold, the conversion dynode will be set to a negative high voltage to attract the ions. As the ions accelerate toward and hit the conversion dynode, secondary electrons will be liberated. Since the potential applied to the conversion dynode is much more negative than the first dynode of the EM, electrons will be accelerated toward the first dynode of the EM. The EM will then multiply these electrons by cascade process of secondary emission. The output of the EM is then measured in counting mode which can provide a range of 1-$10^7$ cps. The EM detector in this embodiment can be either a discrete or a continuous dynode EM. On the contrary, if the image current is higher than a certain value, the conversion dynode will serve as a Faraday cup. This is another innovative aspect of the present invention. Therefore, as the ions hit the dynode, a pico-ammeter is used to measure the resulting current which is then processed and calibrated to determine the number of incoming ions. This can provide a range of $10^8$-$10^{19}$ cps. As a result, the dynamic range of the detector is increased to nearly 20 orders of magnitude. A similar process is used when detecting negative ions, as shown in FIG. 9B, except that the polarity of the conversion dynode is reversed. Therefore, the image current detector is used to automatically switch the detection mode between counting or Faraday cup as well as the polarity of the conversion dynode without any user intervention. This is a completely new method for automatic switching of detection mode.

Figure 10A:
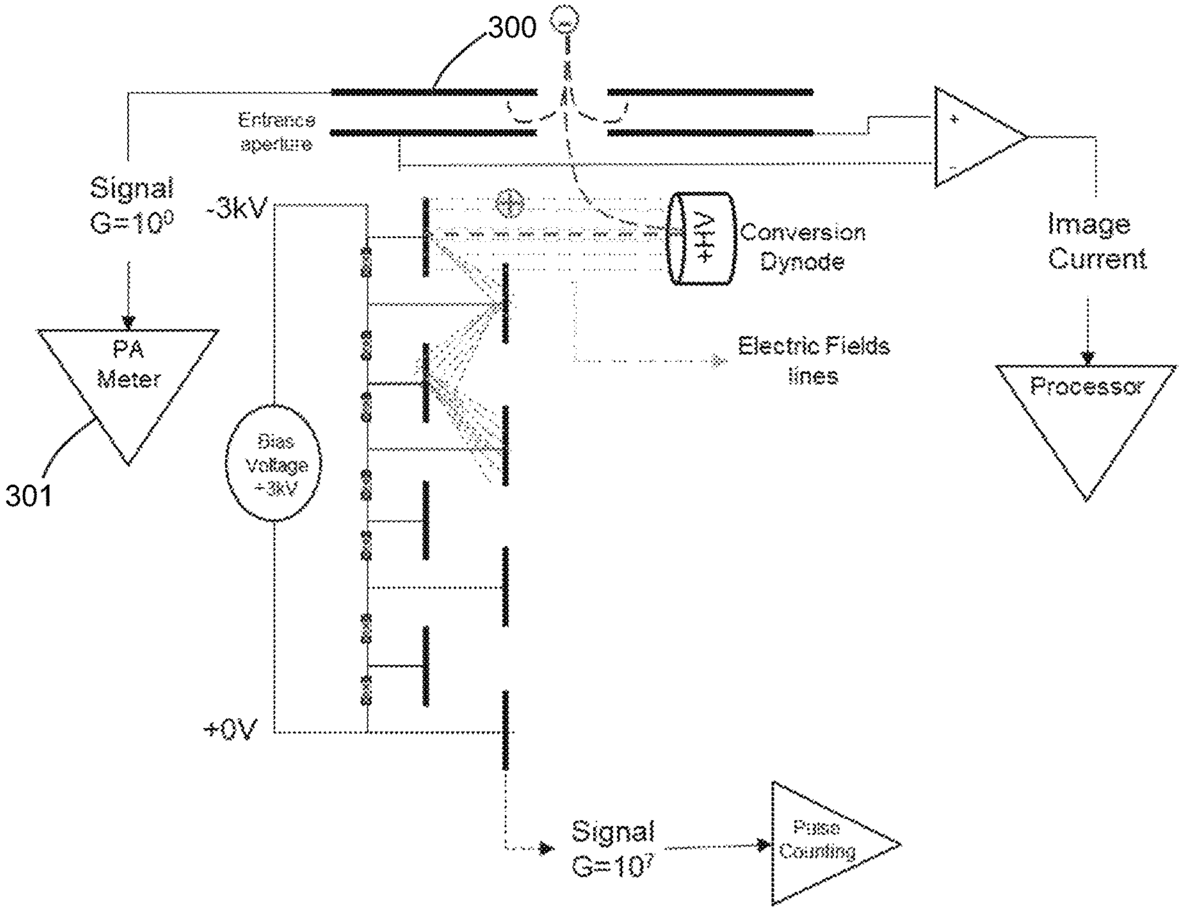
FIG. 10A shows detection of negative ions by conversion dynode (CD), having a lens as a Faraday cup (FC).
Figure 10B:
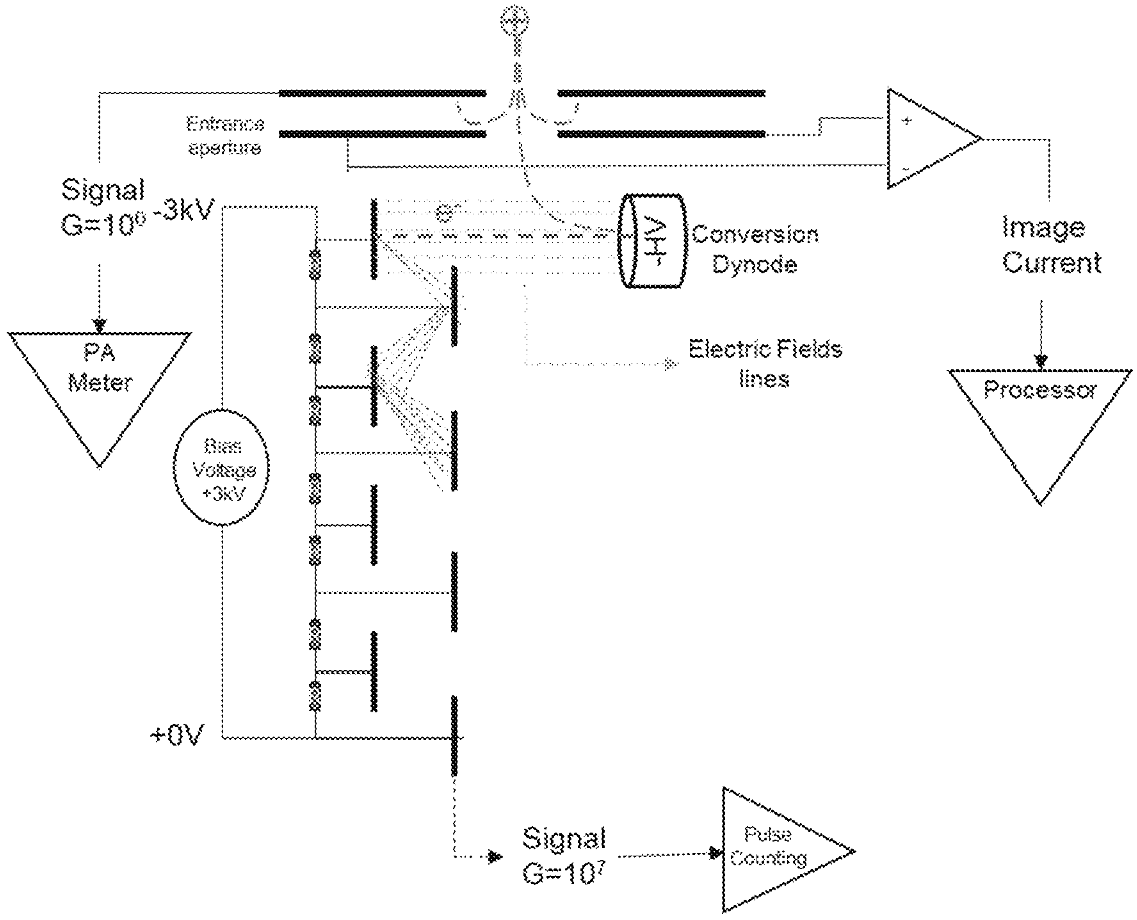
FIG. 10B shows detection of positive ions by conversion dynode (CD), having a lens as a Faraday cup (FC).

FIGS. 10A and 10B show another embodiment of the present invention for extending the dynamic range in detection of positive (FIG. 10A) and negative ions (FIG. 10A). In this case, an additional aperture plate 300 is added in front of the image current aperture to serve as a Faraday cup. Similarly, the image current detector is responsible for selecting the detection mode automatically. If the image current is lower than a certain threshold, then the ions are allowed to path through both apertures to be detected by the detector in counting mode. In this case, the conversion dynode is only used to turn negative ions into positive and vice versa. The EM detector in this embodiment can be either a discrete or a continuous dynode EM. However, if the image current is higher than a threshold, the ions are reflected toward the additional aperture plate. This can be done by applying a potential to the image current aperture plate with reverse polarity to the that of ion beam. The additional aperture plate then plays the role of a Faraday cup. A pico-ammeter 301 may be connected to the aperture plate to measure the current and detect ions accordingly. This is another innovative aspect of the present invention which allows a wide dynamic range between 1-$10^{19}$ cps. A variation of this embodiment is that the order of the image current aperture plate can be switched with the additional aperture plate; that is, the image current aperture can be placed in front of the ion beam. In such a case, the role of the additional aperture plate is only to reflect the ions toward the image current aperture plate which plays the role of a Faraday cup. Once again, in both of these variations, an additional grounded aperture plate (not shown in FIG. 10A) may be placed in front of both the apertures to shield them from electromagnetic field effects due to the mass analyzer in front of the detector and minimize error in measuring the image current and detecting ions using the Faraday cup method.

Figure 11A:
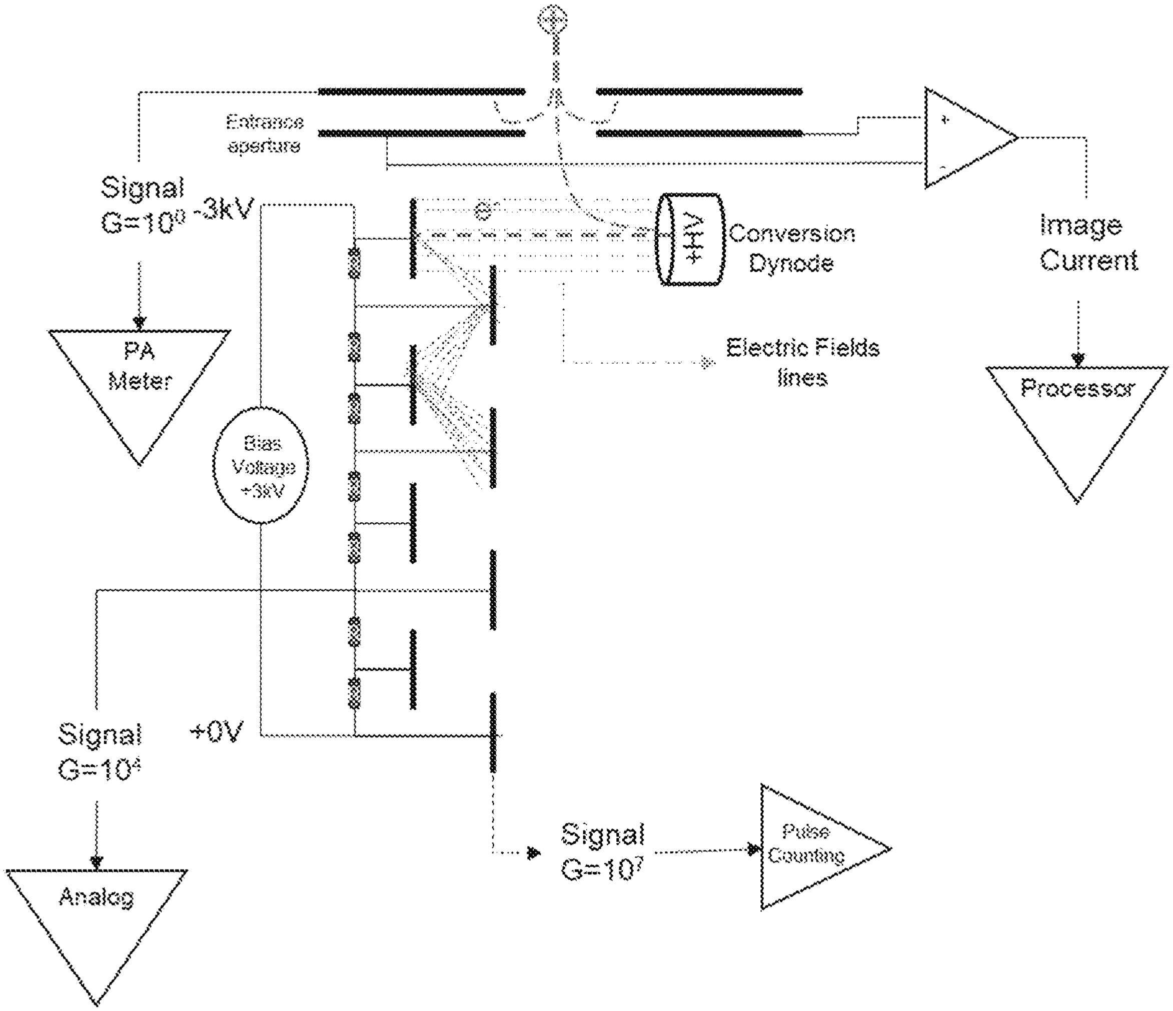
FIG. 11A shows detection of negative ions in full dynamic range, with pulse counting, analog & FC ($10^0$-$10^{19}$ cps).
Figure 11B:
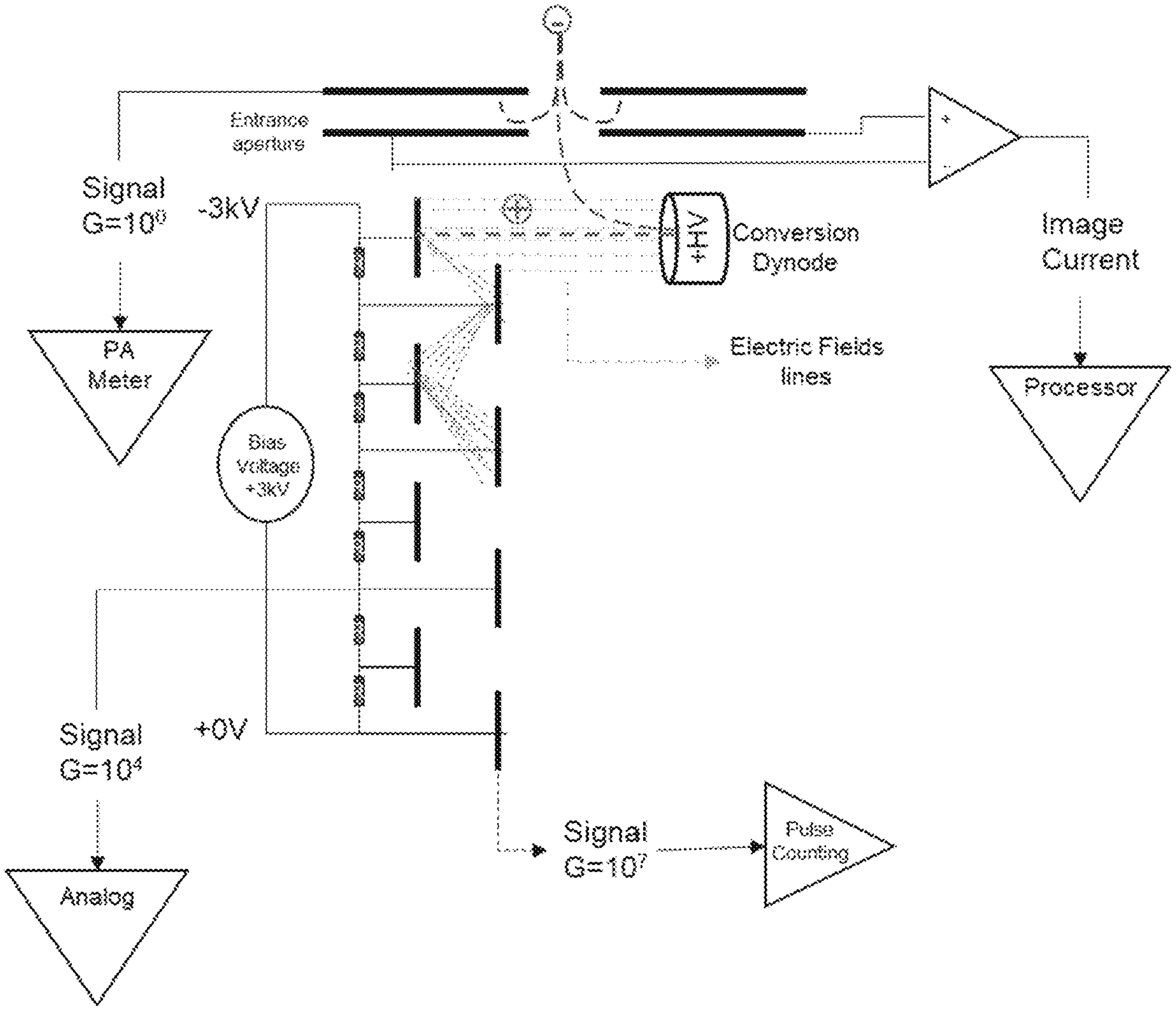
FIG. 11B shows detection of positive ions in full dynamic range, with pulse counting, analog & FC ($10^0$-$10^{19}$ cps).

Other embodiments of the present invention are shown in FIGS. 11A and 11B. In this case, the EM detector can be operated in pulse counting and analog modes. Additionally, the detector is comprised of a Faraday cup too to deal with higher ion current densities. The process for detection of positive ions would be as follows. As the positive ions path through the image current aperture, if the image current is below a certain threshold, the ions will be allowed to go through the aperture plate. Since the conversion dynode is set to a negative high potential, ions will be accelerated toward and hit the conversion dynode. The resulting secondary electrons emitted from the conversion dynode will be then accelerated toward the first dynode of the EM. A discrete dynode multiplier is used in this embodiment. If the initial image current is very low, the multiplication process is allowed to happen all the way to the last dynode of the EM to achieve the maximum gain. The output of the EM is then measured in counting mode which will provide a dynamic range of 1-$10^{6}$ cps depending on the number of dynodes and their secondary emission yield. If the image current is relatively higher, then a gain of $10^{6}$ may saturate the signal. Therefore, the electrons are only multiplied up to the middle of the EM. The output on one of the dynodes in the middle of the EM is measured in analog mode. This will provide a dynamic range of $10^{4}$-$10^{10}$ cps. Finally, if the image current is too high for either counting or analog modes, the incoming ions are reflected to the additional aperture plate which will serve as a Faraday cup. This architecture is especially useful for applications such as ICP-MS in which the abundance of some masses is too high for counting mode, while some elements are available in trace levels which can only be detected in counting mode. This method will provide a dynamic range of up to 20 orders of magnitude. Detection of negative ions will be carried out in a similar manner by reversing the polarity of the conversion dynode and the aperture plate.

Figure 12A:
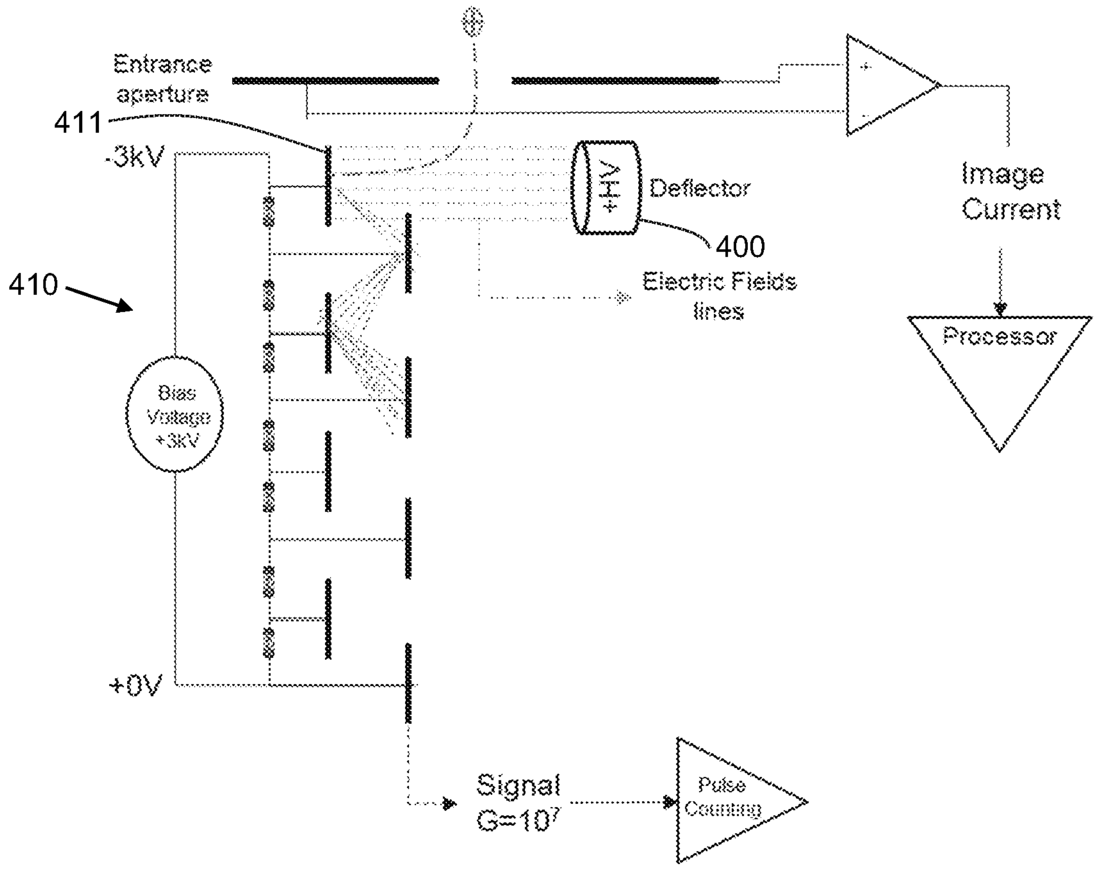
FIG. 12A shows detection of negative ions by deflector, wherein output is at 0V, and entrance lens takes the image current and defines the mode.
Figure 12B:
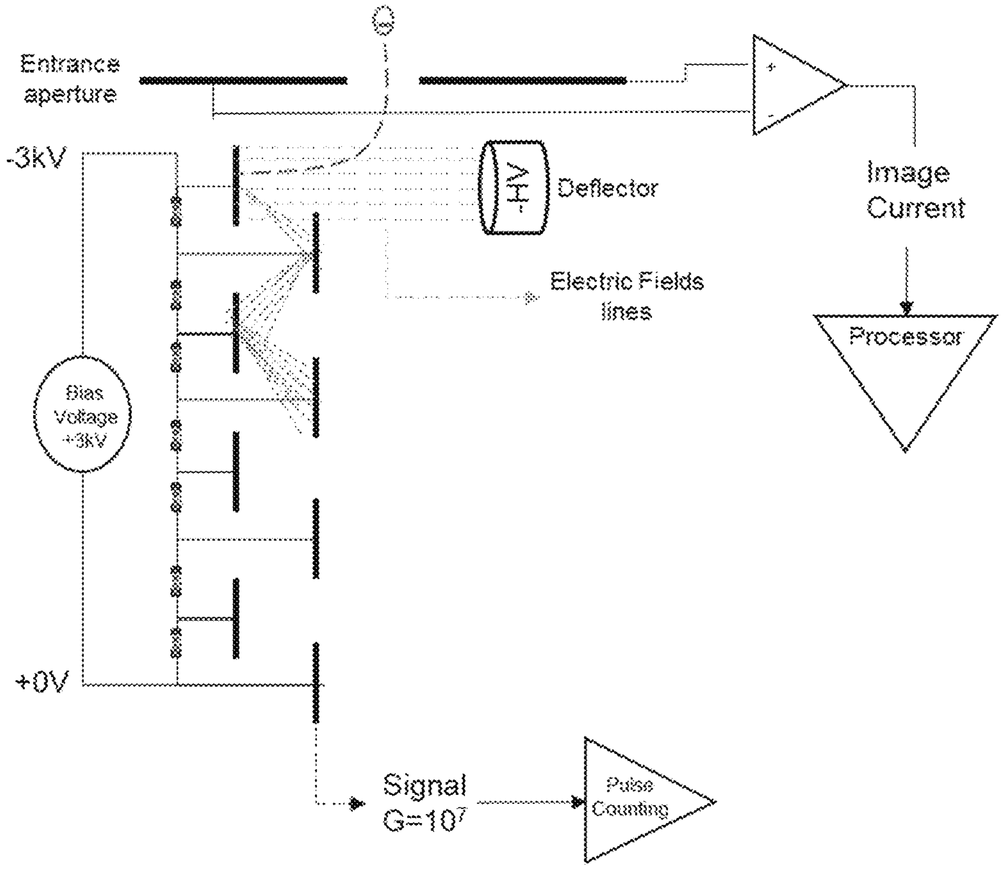
FIG. 12B shows detection of positive ions by deflector, wherein output is at 0V, and entrance lens takes the image current and defines the mode.

FIGS. 12A and 12B show another embodiment of this invention. In this case, a deflector 400 is implemented instead of a conversion dynode. The image current detector is used to determine whether positive or negative ions are coming in. For detection of positive ions, the deflector is set to a positive voltage to accelerate the ions toward the first dynode 411 of the EM 410. Since the first dynode 411 is set to a negative potential, the positive ions hit the dynode and generate secondary electron. These electrons then move toward the later dynodes to be further multiplied. The output of the detector can be measured in counting mode.

For detection of negative ions, while the first dynode of the EM is set to a negative potential, the deflector is set to a negative high voltage to push the ions toward the first dynode. In this way, the negative ions can be still accelerated to and hit the first dynode. Similar to the previous embodiments, the advantage of this method is that regardless of the polarity of the incoming ions, only the potential on the deflector is automatically changed and the voltage on the EM does not need to be switched. This greatly increases the lifetime of the detector, especially for continuous dynode EMs. Furthermore, the output of the detector is always grounded or kept close to ground potential which facilitates the collection of the signal. Otherwise for detection of negative ions, a high potential has to be applied close to the output of the detector to attract the secondary electrons generated at the front of the detector. The EM in this case can be a continuous dynode, discrete dynode, or any other types.

Figure 13A:
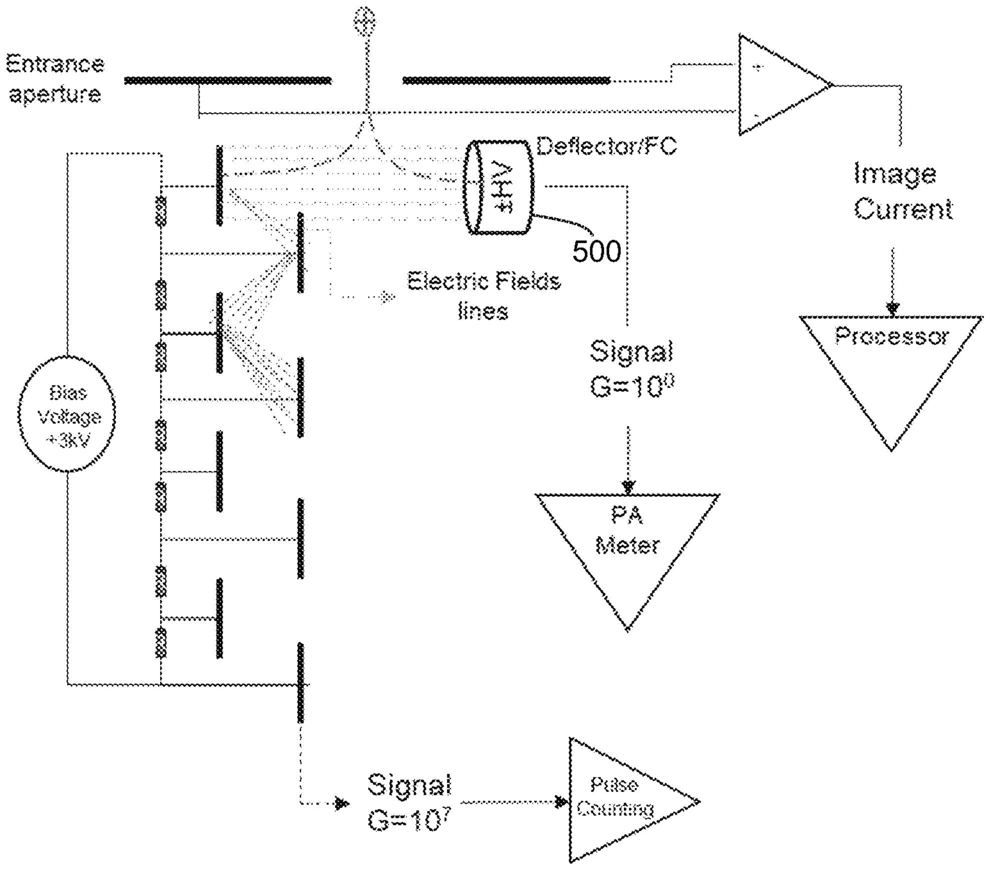
FIG. 13A shows detection of negative ions by deflector, wherein output is at 0V, and CD acts as a Deflector or Faraday cup.
Figure 13B:
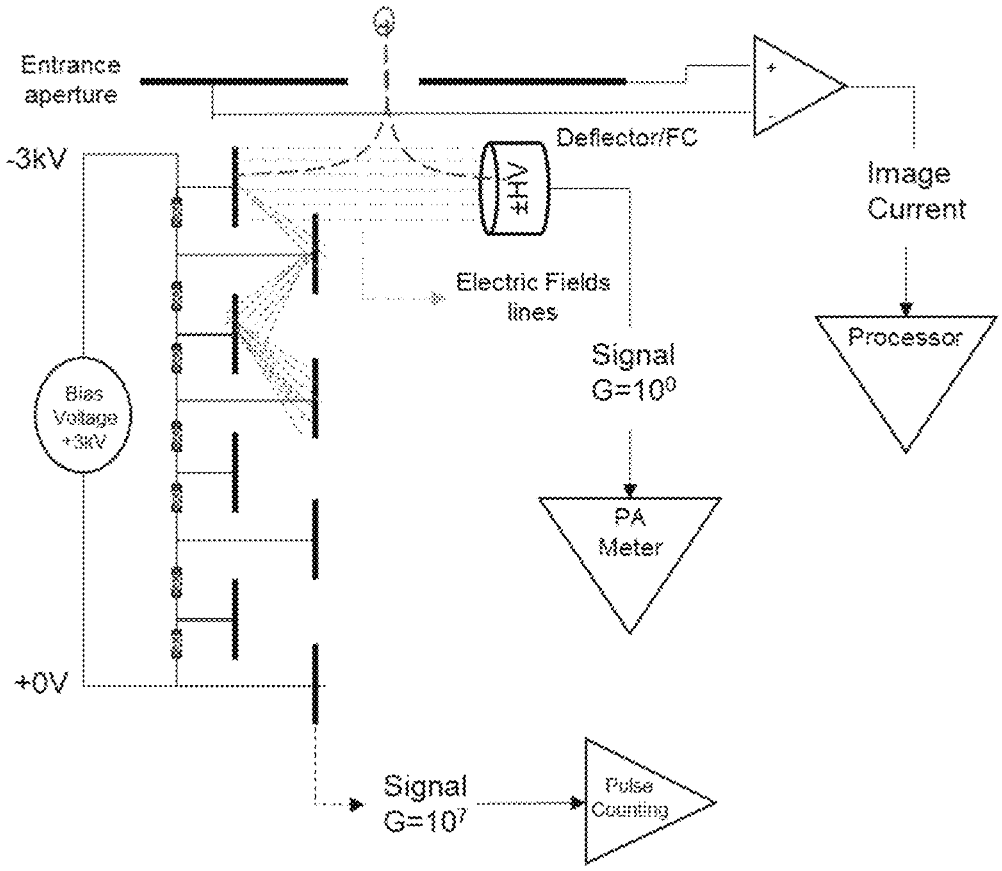
FIG. 13B shows detection of positive ions by deflector, wherein output is at 0V, and CD acts as a Deflector or Faraday cup.

FIGS. 13A and 13B show a variation of the previous embodiment in which the deflector 500 is also used as a Faraday cup. The image current detector is used to switch between positive or negative modes, and to determine whether pulse counting should be performed using the EM, or the Faraday cup should be used to cope with a stronger incoming ion beam. This method can provide a dynamic range of 1-$10^{19}$ cps, with the capability to automatically switch between various modes.

Figure 14A:
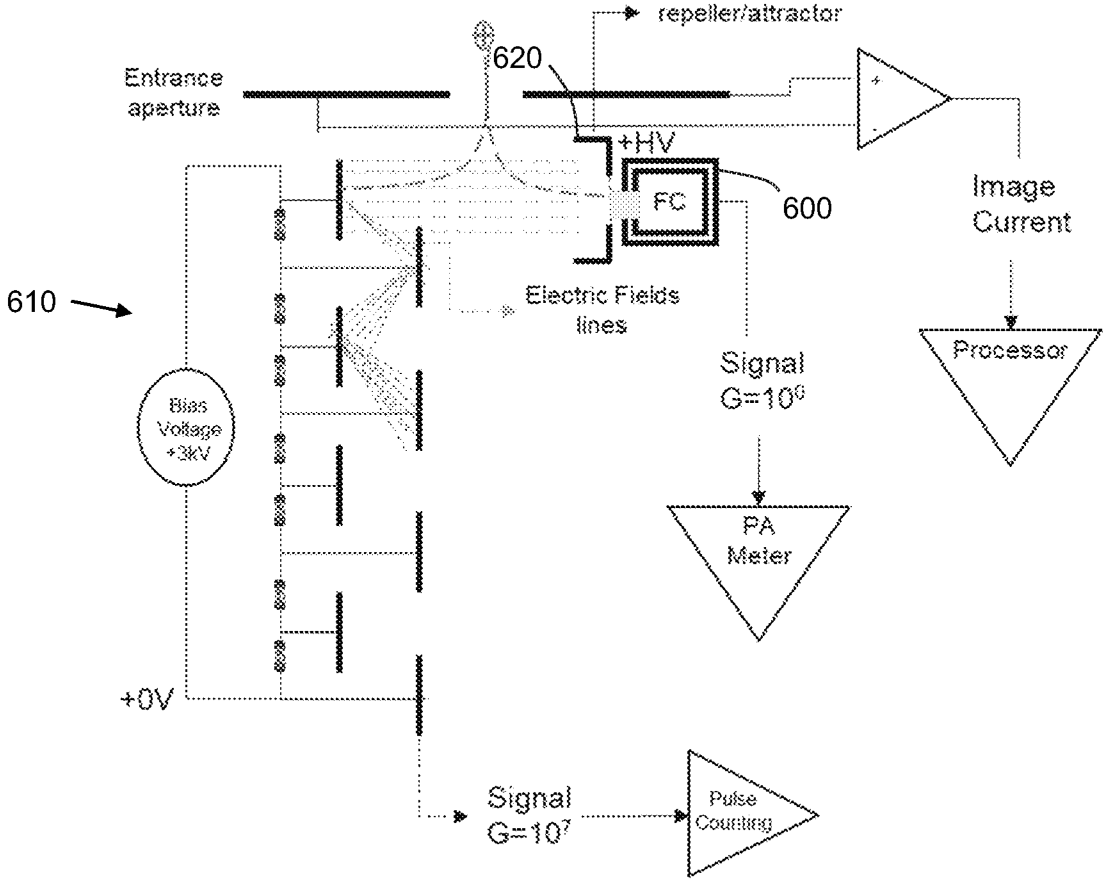
FIG. 14A shows detection of negative ions by repeller/attractor Output is at 0V, wherein Faraday cup is placed behind the "repeller/attractor".
Figure 14B:
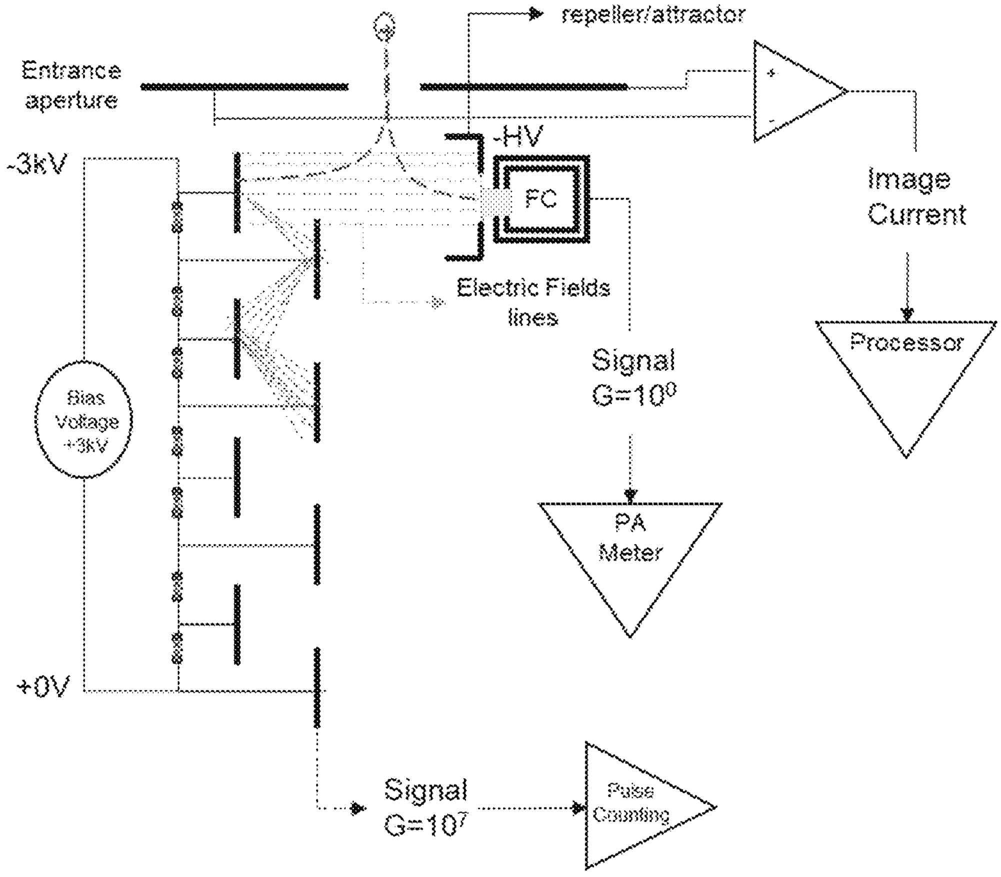
FIG. 14B shows detection of positive ions by repeller/attractor Output is at 0V, wherein Faraday cup is placed behind the "repeller/attractor".

FIGS. 14A and 14B show another embodiment of this invention. In this case, the same image current detector is used to automatically switch between various modes. An additional lens 620 is placed in front of a Faraday cup 600. The additional lens is a deflector plate having a deflector aperture. Depending on the situation, the additional lens can either attract or deflect the ions. For example, if it is determined by the image current detector that counting mode should be used, the additional lens will reflect the ions toward the EM 610. In contrast, if the incoming ion beam is too intense for counting mode, the additional lens will attract and focus the ions. The ions then go through this lens to reach a Faraday cup for detection. The impact of fast ions to the Faraday cup may also result in a shower of secondary electrons to be ejected from the surface. The use of a cup rather than a plate for this purpose is advantageous to prevent these electrons from scaping and cause noise or signal measurement errors. The additional lens can also serve as an electron suppressor to prevent the escape of any of these secondary electrons and dump them to the ground. The role of the image current processing circuit is crucial in these embodiments to automatically switch between various modes, determine the detection polarity, and set the voltages on various components of the detector.

Figure 15A:
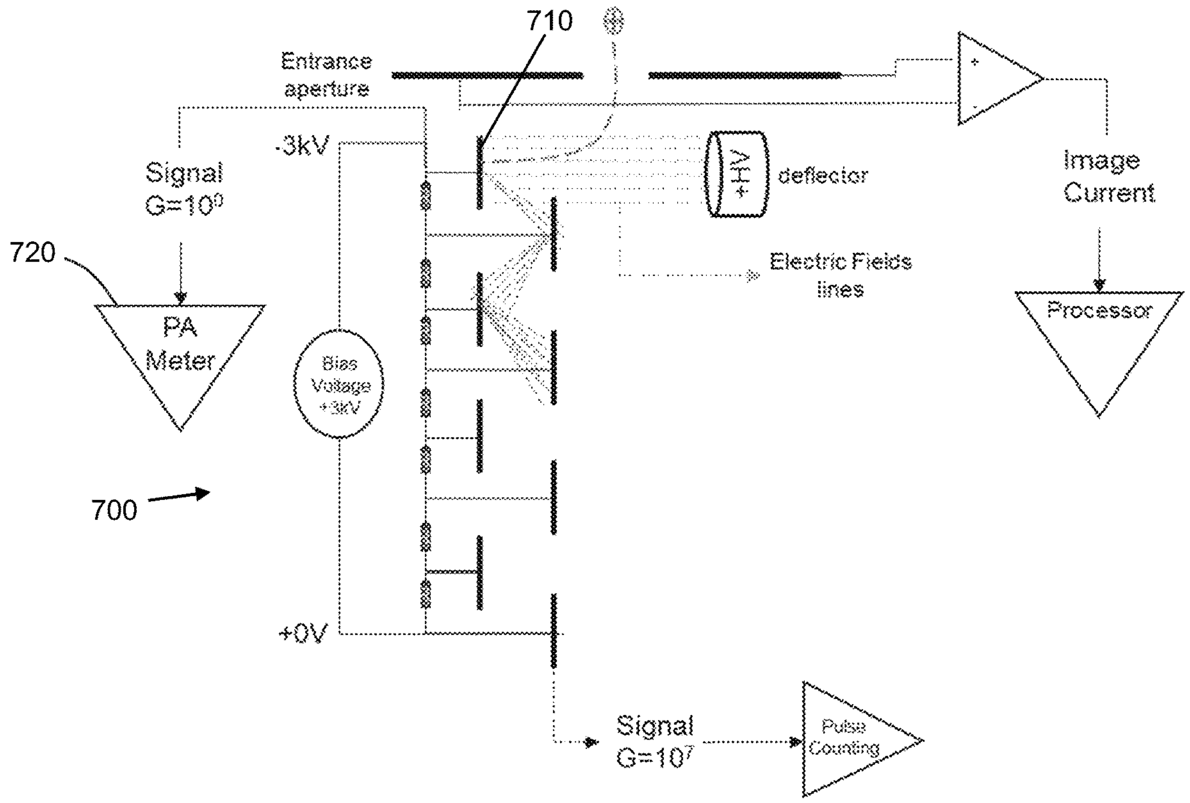
FIG. 15A shows detection of negative ions by deflector, wherein output is at 0V, and PA meter on the first electrode floating at 3.0 kV.
Figure 15B:
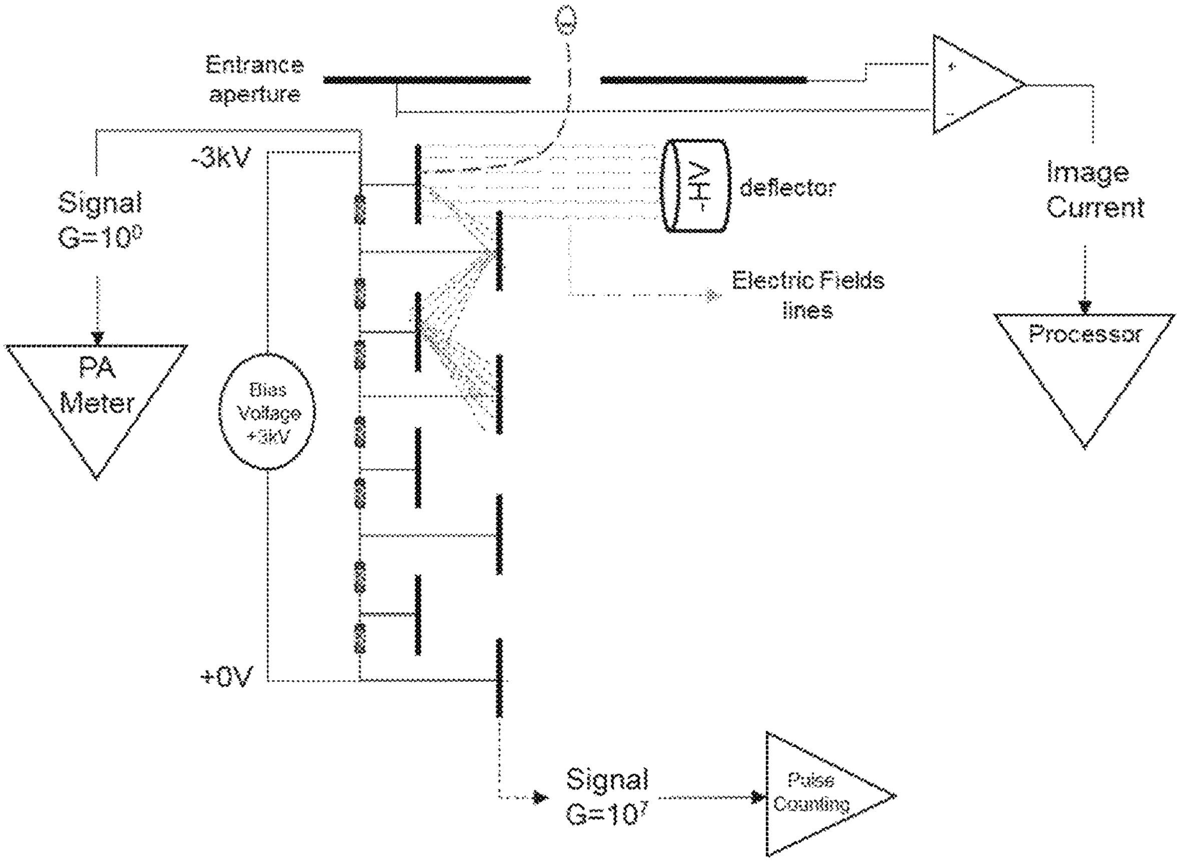
FIG. 15B shows detection of positive ions by deflector, wherein output is at 0V, and PA meter on the first electrode floating at 3.0 kV.
Figure 16A:
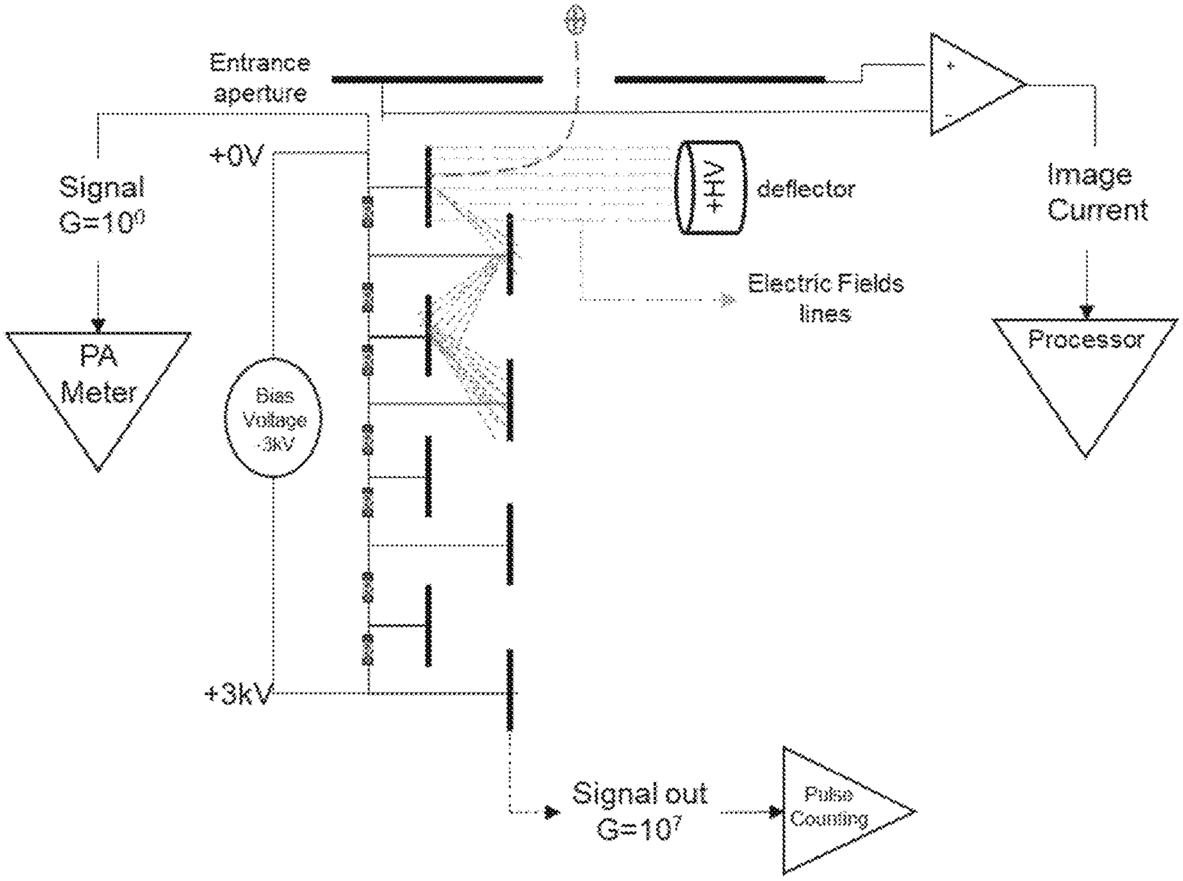
FIG. 16A shows detection of negative ions by deflector, wherein output is floating at +3.0 kV, and first electrode at zero potential acts as a FC.
Figure 16B:
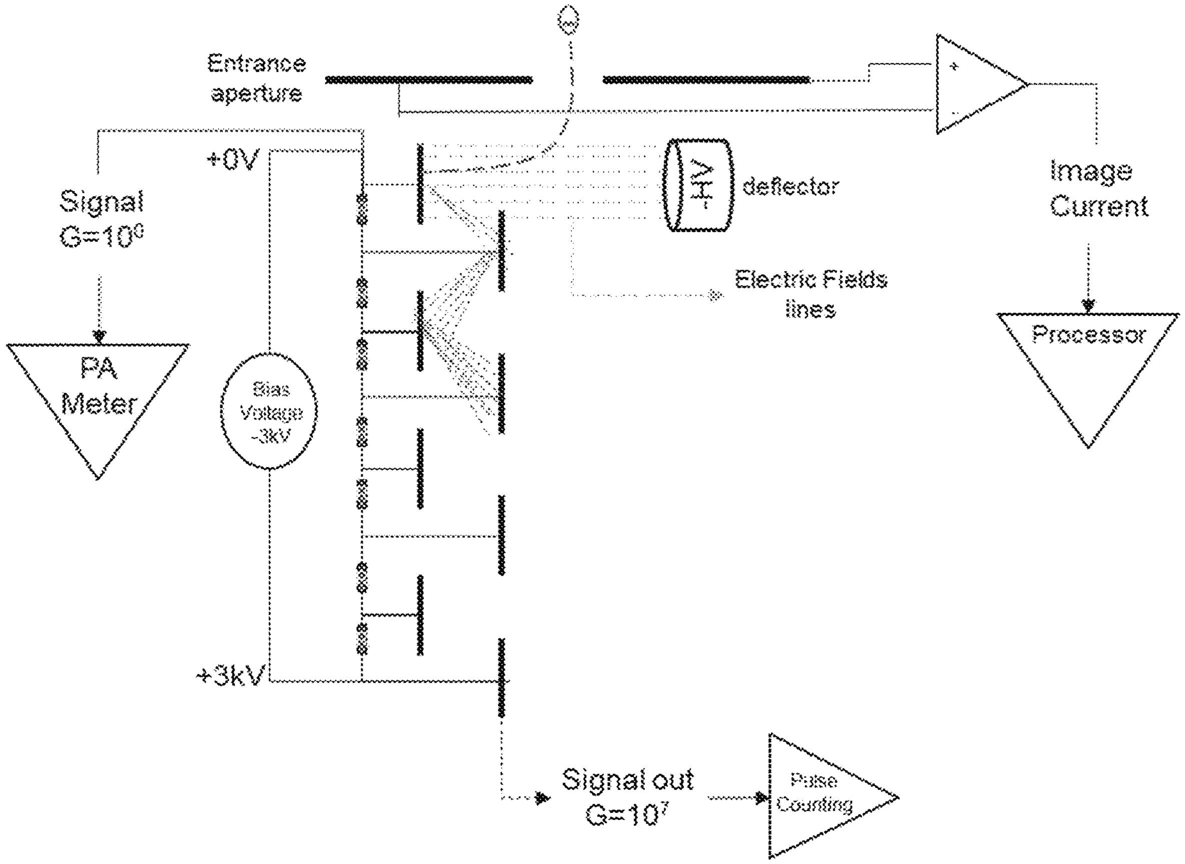
FIG. 16B shows detection of positive ions by deflector, wherein output is floating at +3.0 kV, and first electrode at zero potential acts as a FC.

FIGS. 15A and 15B show another method of detection of ions. In this case, the first dynode 710 of a discrete dynode EM 700 is used as a Faraday cup when the intensity of the incoming ions is too high for pulse counting. A pico-ammeter 720 and a signal processing circuit is connected to the first dynode in this case to measure the resulting current. The image current detector determines the polarity of the deflector and the measurement mode. If the intensity of the incoming ions is lower than a threshold, the first dynode will be set to its normal operation and the EM will multiply the electrons further to measure the signal in counting mode. FIGS. 16A and 16B are variation of the embodiment shown in FIGS. 15A and 15B, respectively, in which the bias voltage on the EM is reversed. That is, the first dynode of the EM is grounded instead of being of a negative high potential. This will facilitate the measurement of signal when the first dynode is used as Faraday cup.

Figure 17A:
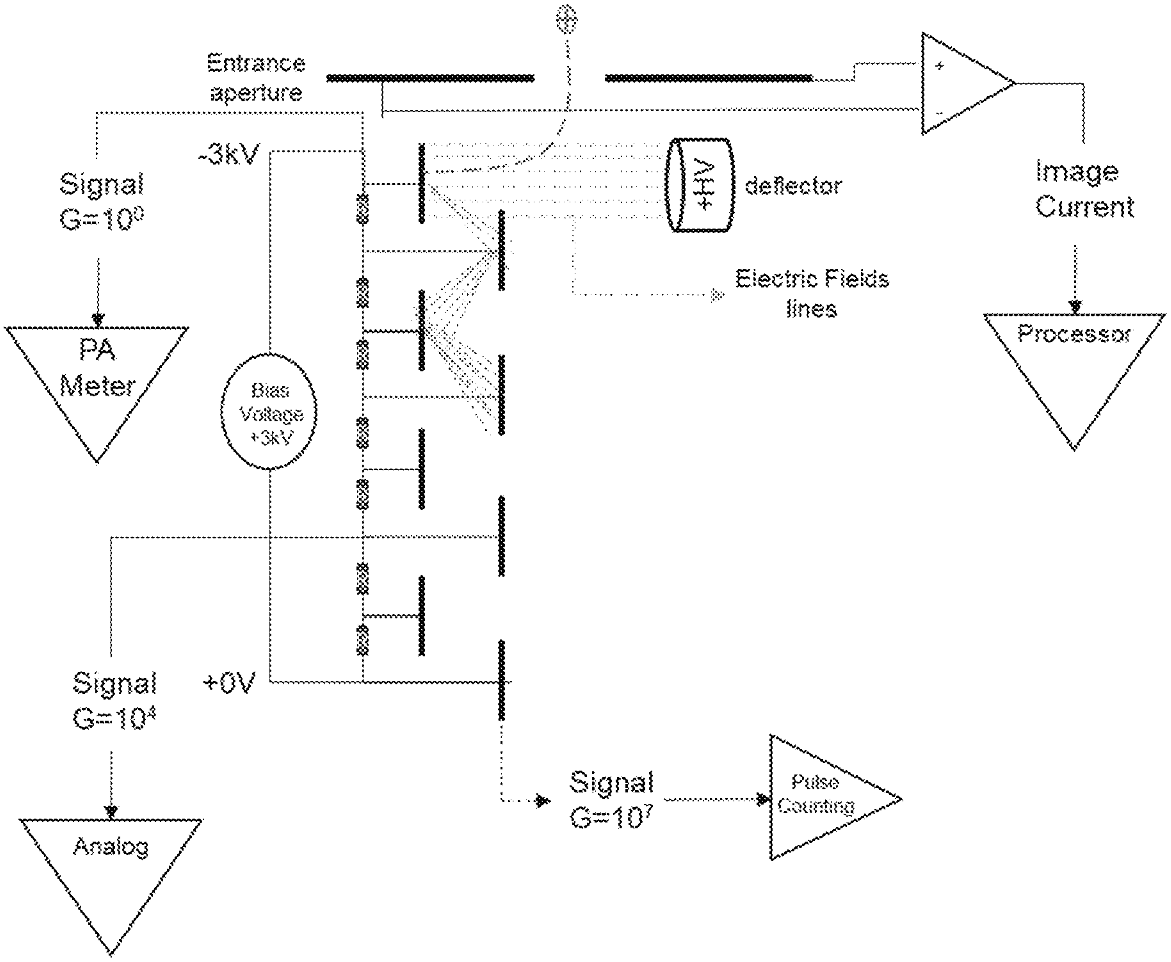
FIG. 17A shows detection of negative ions by deflector, wherein output is at 0V, PA meter on the first electrode floating at −3.0 kV, and full dynamic range by PC, Analog & FC.
Figure 17B:
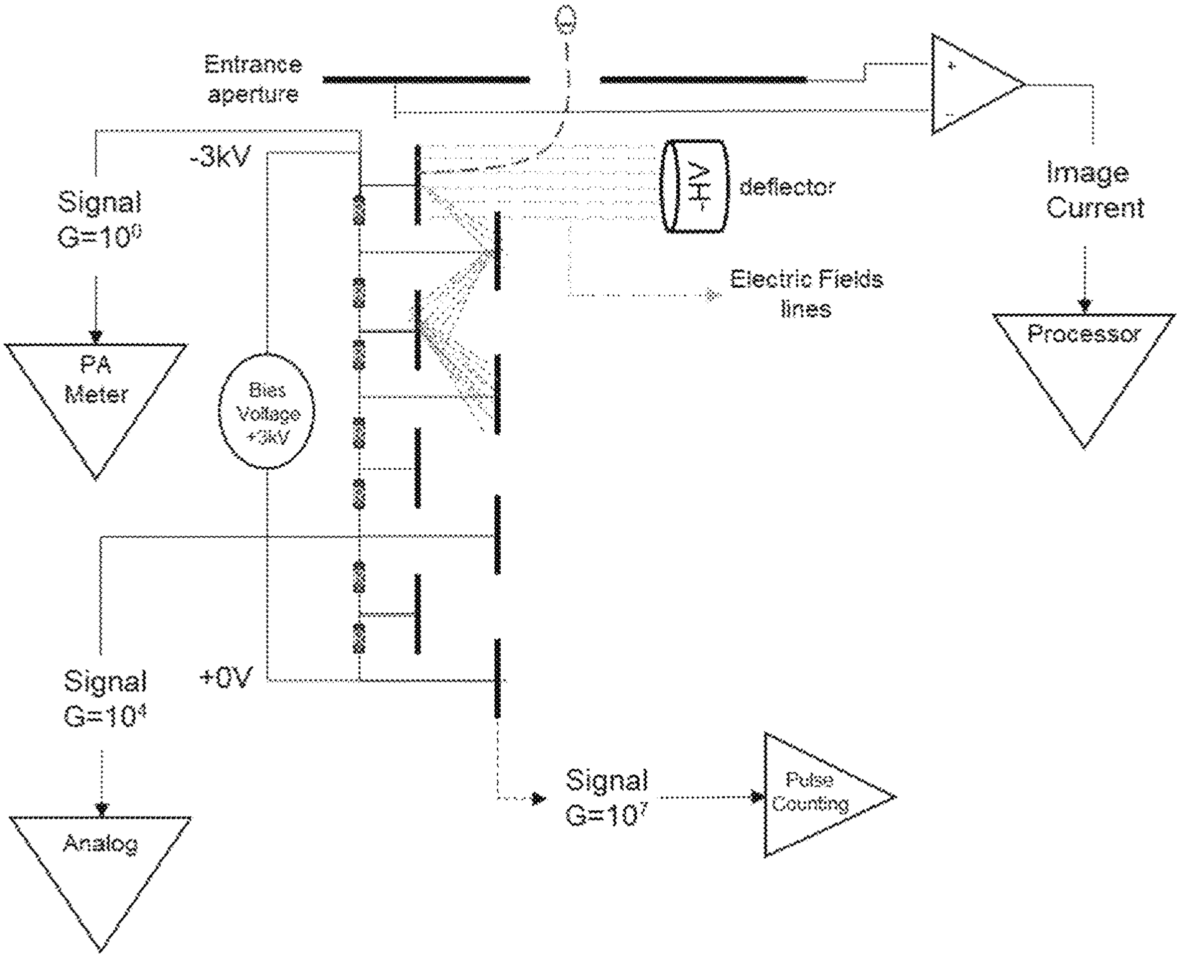
FIG. 17B shows detection of positive ions by deflector, wherein output is at 0V, PA meter on the first electrode floating at −3.0 kV, and full dynamic range by PC, Analog & FC.
Figure 18A:
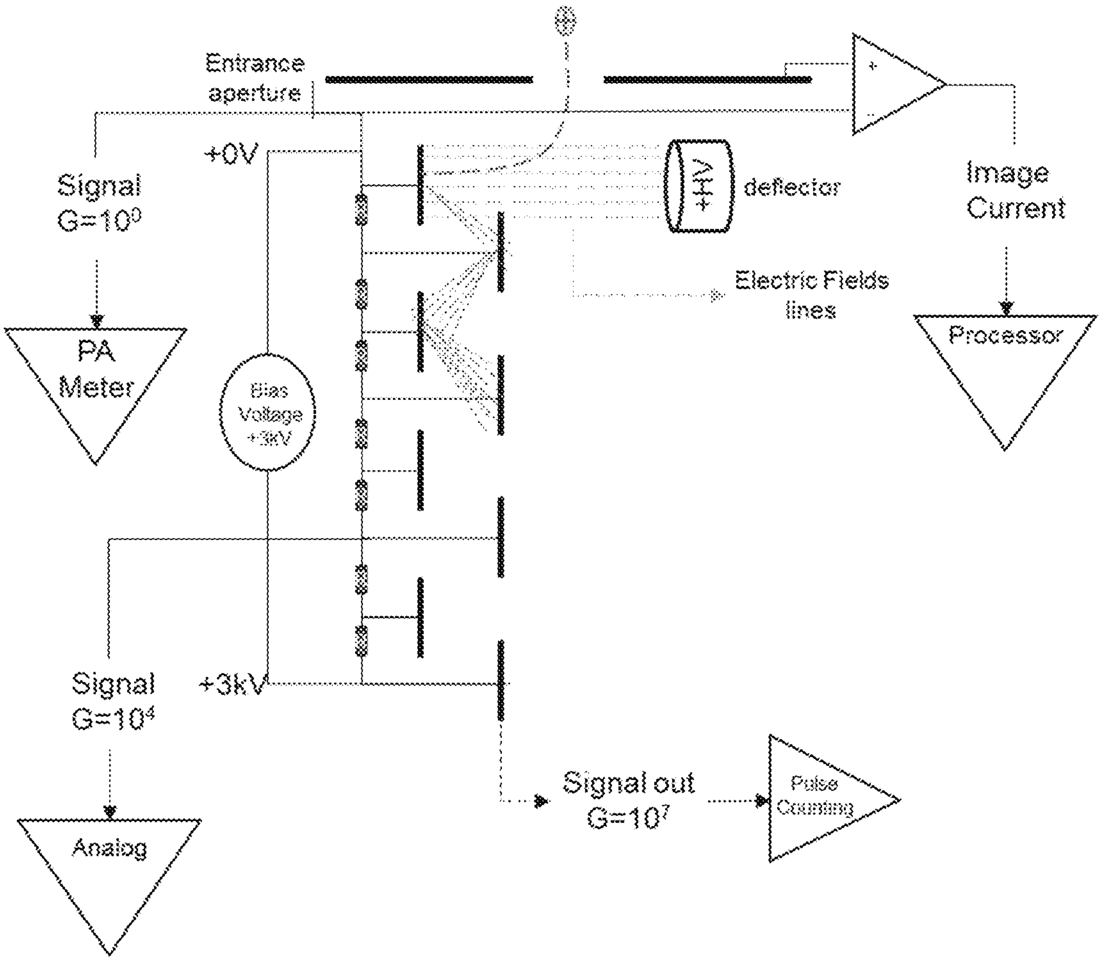
FIG. 18A shows detection of −ve ions by deflector, and output is floating at 3.0 kV, and full dynamic range.
Figure 18B:
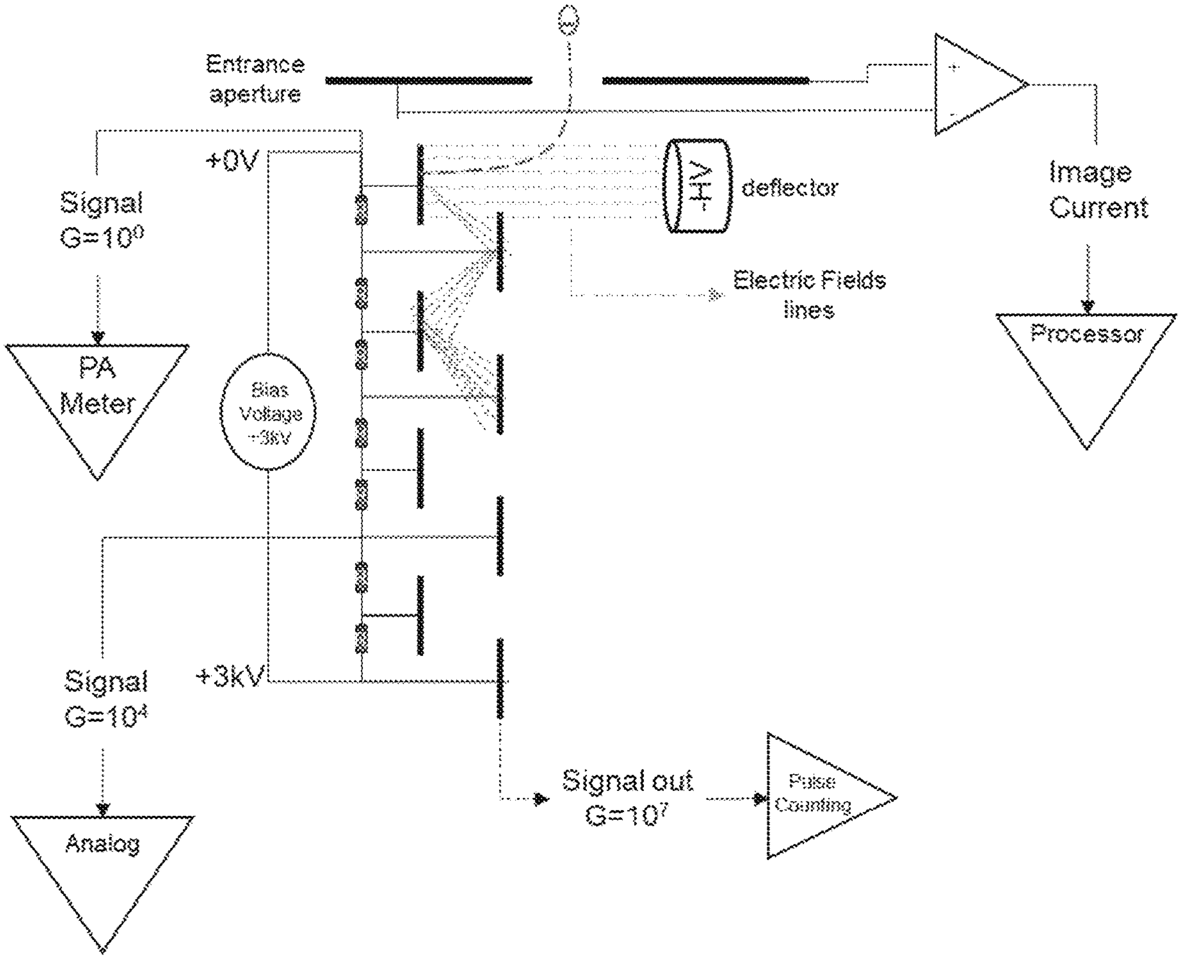
FIG. 18B shows detection of +ve ions by deflector, and output is floating at 3.0 kV, and full dynamic range.

FIGS. 17A and 17B shows an extension of the embodiment shown in FIGS. 15A and 15B. This embodiment includes three different detection modes that cover a dynamic range starting from 1 to $10^{19}$ cps. The image current measurement is used to switch between these modes. The deflector is used to push and accelerate the incoming ions toward a discrete dynode multiplier. If the incoming ion beam is too intense, the detector will work in Faraday cup mode. The first dynode of the EM is used for this purpose which is connected to a pico-ammeter and the signal processing circuit. If the intensity of the incoming ions is too low, then the EM will be used fully, and the output of the EM is measured at its last dynode in counting mode. The gain in this case may reach $10^7$ depending on the number of dynodes and the secondary emission yield, and other design features of the EM. If the intensity of the ions is somewhere in between, then the output on one of the dynodes in the middle of the EM is measured in analog mode. In this case, the gain of the EM would be, for example, $10^4$ which prevent the saturation of the signal. This multimode detector can cover the whole dynamic range from 1 cps to over $10^{19}$ cps. Furthermore, since the same voltages are used on the EM for detection of both positive and negative ions, the lifetime of the detector is not deteriorated and electronics settling time is minimized. FIGS. 18A and 18B is another variation of the embodiment shown in FIGS. 17A and 17B in which the bias voltage on the EM is reversed. In this case, the first dynode of the EM is grounded while the output is floating. This facilitates the measurement of signal when the first dynode is used as Faraday cup.

What is claimed is:

1. A system for detection of positive and negative ions in a mass spectrometer, comprising:

an aperture plate that is conductive and ungrounded;

an ion beam having a polarity and a current density that is emerging from a mass analyzer and can pass through the aperture plate, thereby inducing an image current into the aperture plate which is proportional to the current density and polarity of the ion beam;

one or more ion detectors;

an ion beam directing element configured to the ion beam to impinge onto a chosen one of said one or more ion detectors to produce a signal output;

a signal processing circuit to measure and process the signal output from each ion detector, the signal processing circuit further having one or several signal processing modes;

an image current processing circuit to amplify and measure the image current and compare it against one or more reference thresholds to automatically determine which said one or more ion detectors the ion beam should be directed to and which the signal processing mode should be used.

2. The system of claim 1, in which the aperture plate has one or more entrance apertures to allow the ion beam to pass through.

3. The system of claim 1, in which the aperture plate is a grid or a mesh with multiple entrance apertures.

4. The system of claim 1, in which the one or several signal processing modes comprises an analog mode and a pulse counting mode.

5. The system of claim 1, further comprising an additional conductive plate placed between the mass analyzer and the aperture plate to shield the aperture plate from electromagnetic interference from the mass analyzer and minimize error in measuring the image current, the additional conductive plate having at least one aperture to let the ion beam pass through and reach the aperture plate.

6. The system of claim 5, in which the additional conductive plate is a conductive grid or a mesh with multiple apertures, pores, or openings.

7. The system of claim 1, wherein the ion beam directing element comprises a conversion dynode to convert the polarity of the ion beam, in which a high electrical potential with reverse polarity to that of the ion beam is applied to the conversion dynode to attract the ion beam, wherein the ion beam striking the conversion dynode liberates secondary electrons when the polarity of the ion beam is positive or turns the negative ions into positive ions when the polarity of the ion beam is negative, the conversion dynode then accelerates said secondary electrons or said positive ions toward the one or more ion detectors to be detected.

8. The system of claim 1, in which the one or more ion detector is a discrete dynode electron multiplier having a first dynode followed by an additional number of dynodes in succession, in which the ion beam is directed to hit the first dynode to liberate secondary electrons, the secondary electrons being multiplied a further number of times by hitting the additional dynodes, thereby forming a signal output in the range of 1 to $10^8$ counts per seconds when operated in pulse counting mode, or a signal output in the range of $10^4$ to $10^{10}$ counts per second when operated in analog mode.

9. The system of claim 8, in which the ion beam is directed toward the first dynode by a conversion dynode, thereby eliminating a need for switching the polarity of the dynodes for detection of positive or negative ions, thereby preventing deterioration of the dynodes due to constant polarity switching and increasing the lifetime of the ion detector.

10. The system of claim 8, having a last dynode which is kept at a zero potential, thereby facilitating the measurement of the signal output.

11. The system of claim 1, in which said one or more ion detector is a continuous dynode electron multiplier, having a continuous dynode, in which the ion beam is directed to hit the continuous dynode to liberate secondary electrons, the secondary electrons being further multiplied by hitting the continuous dynode multiple times, thereby forming a signal output in a range of 1 to $10^8$ counts per second when operated in pulse counting mode, or a signal output in the range of $10^4$ to $10^{10}$ counts per second when operated in analog mode.

12. The system of claim 11, in which the ion beam is directed toward the continuous dynode electron multiplier by a conversion dynode, thereby eliminating a need for switching the polarity of continuous dynode electron multiplier for detection of positive or negative ions, thereby preventing deterioration of the continuous dynode electron multiplier due to constant polarity switching and increasing the lifetime of the ion detector.

13. The system of claim 1, further comprising a Faraday cup with a signal output configured to serve as a second ion detector in combination with an electron multiplier, wherein the Faraday cup is configured to detect ion currents within a dynamic range of $10^8$ to $10^{19}$ counts per second, thereby extending the dynamic range of the detection system to 19 orders of magnitude.

14. The system of claim 13, wherein the signal output of the Faraday cup is measured using a pico-ammeter, an ammeter, or the signal processing circuit.

15. The system of claim 13, wherein the image current processing circuit is configured to compare the measured image current with one or more threshold values, each threshold value being associated with a signal output range corresponding to a detection mode of the system, and to direct the ion beam toward the Faraday cup when the measured image current exceeds a higher threshold value, to direct the ion beam toward the electron multiplier when the measured image current is below the higher threshold value, to operate in an analog detection mode when the measured image current exceeds a lower threshold value, and to operate in a pulse counting mode when the measured image current is below the lower threshold value.

16. The system of claim 8, in which the discrete dynode electron multiplier has a first electron multiplication stage and a second electron multiplication stage each having a separate signal output, the first electron multiplication stage starting from the first dynode to an intermediate dynode, the second electron multiplication stage starting from said intermediate dynode to the last dynode, in which the secondary electrons are allowed to multiply up to the first electron multiplication stage when the signal processing mode is set to analog mode, otherwise the electrons are allowed to fully multiply up to the second electron multiplication stage when the signal processing mode is set to pulse counting mode.

17. The system of claim 16, in which the signal processing mode is set to analog mode when the image current is higher than a reference threshold associated with $10^6$ counts per second, otherwise to pulse counting mode when the image current is lower than the said reference threshold.

18. The system of claim 7, in which the conversion dynode is used as a Faraday cup by applying a potential to the conversion dynode with reverse polarity to that of the ion beam and directing the ion beam to hit the conversion dynode, in which the signal output is measured by connecting a pico-ammeter to the conversion dynode.

19. The system of claim 1, in which the mass analyzer is any of a quadrupole, sector field, ion trap, time-of-flight, ion mobility, or any other type.

20. The system of claim 1, wherein the one or more ion detectors are placed off-axis relative to the ion beam and wherein the ion beam is directed toward the one or more ion detectors by a conversion dynode or a deflector.

21. The system of claim 1, wherein the ion beam directing element comprises an ion deflector to deflect the ion beam toward a desired ion detector of the one or more ion detectors, in which a high electrical potential with the same polarity as that of the ion beam is applied to the deflector to push and accelerate the ion beam toward the one or more ion detectors, thereby eliminating a need for switching the polarity of the one or more ion detectors for detection of positive or negative ions, thereby preventing deterioration of the one or more ion detectors due to constant polarity switching and increasing the lifetime of the one or more ion detectors.

22. The system of claim 1, wherein a deflector is configured to selectively operate as a Faraday cup by applying an electrical potential having a polarity opposite to that of the ion beam to attract the ion beam to the deflector, wherein a resulting current generated at the deflector is measured as a signal output.

23. The system of claim 1, further comprising an additional lens element placed off-axis relative to the ion beam, the additional lens element having at least one lens aperture to let the ion beam pass through the additional lens element, the system further comprising a Faraday cup with a signal output placed behind the additional lens element, in which a potential is applied to the additional lens element to attract the ion beam and let the ion beam pass through the lens aperture to reach the Faraday cup, alternatively a potential being applied to the additional lens element to repel and direct the ion beam toward a continuous or discrete dynode electron multiplier, thereby eliminating a need for switching the polarity of the continuous or discrete electron multiplier for detection of positive or negative ions to increase the lifetime of the continuous or discrete electron multiplier while extending the dynamic range of the system to $10^{19}$ counts per second (cps).

24. The system of claim 8, in which the first dynode is used as a Faraday cup with an independent signal output connected to a pico-ammeter or the signal processing circuit.

25. The system of claim 24, further comprising a first electron multiplication stage and a second electron multiplication stage each having a separate signal output, the signal output of the first electron multiplication stage being measured in analog mode and the signal output of the second electron multiplication stage being measured in pulse counting mode, thereby extending the dynamic range of the system to $10^{19}$ counts per second (cps).

26. The system of claim 1, further comprising an additional conductive plate placed between the mass analyzer and the aperture plate, the additional conductive plate having at least one aperture to let the ion beam pass through and reach the aperture of the aperture plate, the additional conductive plate further having a signal output being connected to a pico-ammeter or the signal processing circuit, in which the ion beam can be reflected back toward the additional conductive plate by applying a potential to the aperture plate with reverse polarity to that of the ion beam, thereby using the additional conductive plate as a Faraday cup.

27. The system of claim 1, in which the aperture plate is used as the one or more ion detector by electrically connecting it to the signal processing circuit to measure the signal output due to the ion beam impinging onto the aperture plate, in which if the signal output is less than $10^8$ counts per second, the ion beam is allowed to pass through to be measured in pulse counting mode or analog mode with another ion detector.

28. A method for detection of positive and negative ions in a mass spectrometer, the mass spectrometer comprising one or more ion detectors, a signal processing circuit to measure and process the signal output from each ion detector, the signal processing circuit further having one or several signal processing modes, an image current processing circuit to amplify and measure an image current and compare it against one or more reference thresholds to automatically determine which said one or more ion detectors the ion beam is directed to and which the signal processing mode is used, comprising steps of:

placing an aperture plate that is conductive and ungrounded on the path of an ion beam having a polarity and a current density that is emerging from a mass analyzer and can pass through the aperture plate, thereby inducing an image current into the aperture plate which is proportional to the current density and polarity of the ion beam;

placing the one or more ion detectors that is a discrete or continuous dynode electron multiplier placed off-axis with respect to an incoming ion beam, placing a conversion dynode off-axis with respect to the incoming ion beam, applying a high potential with reverse polarity to that of the ion beam to the conversion dynode to attract the ion beam to hit the conversion dynode, wherein the ion beam striking the conversion dynode liberates secondary electrons when the polarity of the ion beam is positive or turns the negative ions into positive ions when the polarity of the ion beam is negative, accelerating the secondary electrons or positive ions toward the one or more ion detectors by a potential difference between the conversion dynode and the discrete or continuous dynode electron multiplier, using the image current to automatically switch the polarity of the conversion dynode based on the polarity of the ion beam, in which there is no need for switching the polarity on the electron multiplier for detection of positive or negative ions, thereby increasing the lifetime of the one or more ion detectors.

29. The method of claim 28, wherein the conversion dynode is configured to operate as a Faraday cup when a measured ion signal exceeds a threshold level, the threshold level being associated with a signal output range corresponding to a Faraday cup detection mode, wherein the method further comprises detecting ion signals over a dynamic range from 1 to $10^{19}$ counts per second by selectively operating in a pulse counting mode, an analog detection mode, and the Faraday cup detection mode.

* * * * *